(12) United States Patent
Hamada

(10) Patent No.: US 7,710,657 B2
(45) Date of Patent: May 4, 2010

(54) DISTRIBUTED REFRACTIVE INDEX LENS AND METHOD FOR MANUFACTURING THE SAME

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 355 days.

(21) Appl. No.: 11/813,942

(22) PCT Filed: Jan. 18, 2006

(86) PCT No.: PCT/JP2006/300655

§ 371 (c)(1),
(2), (4) Date: Jul. 13, 2007

(87) PCT Pub. No.: WO2006/077889

PCT Pub. Date: Jul. 27, 2006

(65) Prior Publication Data

US 2009/0052048 A1    Feb. 26, 2009

(30) Foreign Application Priority Data

Jan. 19, 2005   (JP)   ............................ 2005-011936
Feb. 4, 2005    (JP)   ............................ 2005-029852

(51) Int. Cl.
 *G02B 9/00*    (2006.01)
 *G02B 1/12*    (2006.01)
(52) U.S. Cl. ........................ 359/654; 359/652; 264/1.38
(58) Field of Classification Search ................ 264/1.38, 264/2.7; 348/46, 49, 54, 59; 359/652, 653, 359/654; 385/120, 129; 427/510, 515
See application file for complete search history.

(56) References Cited

FOREIGN PATENT DOCUMENTS

| | | |
|---|---|---|
| JP | 60-064310 | 4/1985 |
| JP | 60-175010 | 9/1985 |
| JP | 01-134310 | 5/1989 |
| JP | 06-222234 | 8/1994 |
| JP | 07-092313 | 4/1995 |
| JP | 09-043539 | 2/1997 |
| JP | 09-080201 | 3/1997 |
| JP | 10-150675 | 6/1998 |
| JP | 11-305164 | 11/1999 |
| JP | 2000-122191 | 4/2000 |
| JP | 2002-286912 | 10/2002 |
| JP | 2002-323604 | 11/2002 |
| JP | 2004-086175 | 3/2004 |
| JP | 2005-141083 | 6/2005 |
| JP | 2005-326641 | 11/2005 |
| JP | 2005-331739 | 12/2005 |
| JP | 2005-331814 | 12/2005 |

OTHER PUBLICATIONS

International Search Report for Application No. PCT/JP2006/300655 dated Mar. 7, 2006.

*Primary Examiner*—David N Spector
(74) *Attorney, Agent, or Firm*—RatnerPrestia

(57) ABSTRACT

A distributed refractive index lens and method of producing the lens are disclosed. The lens has a plurality of areas having refractive index distributions, and includes a plate-like member containing polysilane. The refractive index distribution of these areas is a distribution that includes a change in a refractive index in a direction parallel to a plane of the plate-like member, and includes a substantial uniform refractive index in a direction perpendicular to the plane.

36 Claims, 27 Drawing Sheets

ULTRAVIOLET RAY, HEAT, OXYGEN (a)

(b)

MASK MACHINING METHOD (a)

(b)

(c)

DISTRIBUTED REFRACTIVE INDEX LENS AND METHOD FOR MANUFACTURING THE SAME

CROSS-REFERENCE TO RELATED APPLICATIONS

This application is a U.S. national phase application of PCT International Patent Application No. PCT/JP2006/300655 filed Jan. 18, 2006, claiming the benefit of priority of Japanese Patent Application Nos. 2005-011936 filed Jan. 19, 2005, and 2005-029852 filed Feb. 4, 2005, all of which are incorporated by reference herein in their entirety.

TECHNICAL FIELD

The present invention relates to a distributed refractive index lens and a production method of the distributed refractive index lens. For example, the present invention relates to a distributed refractive index lens used as a distributed refractive index lens array panel of an image pickup apparatus and a reproduction apparatus of an Integral Photography (hereinafter abbreviated as IP) type three-dimensional television using a lens group, and a production method of the distributed refractive index lens.

BACKGROUND ART

As one type of three-dimensional television systems that can be viewed from any point, IP using a refractive index distribution lens group arranged on a plane has been known (for example, see Japanese Patent Laid-Open No. 10-150675). The refractive index distribution lens is herein also referred to as a GRIN lens or simply as a GI lens.

FIG. 30 shows a configuration of a three-dimensional image pickup apparatus in Japanese Patent Laid-Open No. 10-150675.

In FIG. 30, reference numerals $121_1, 121_2, \ldots, 121_n$ denote optical fibers, and reference numeral 122 denotes a television camera that picks up the entire images of the optical fibers.

The optical fibers $121_1, 121_2, \ldots, 121_n$ have refractive index distribution with a higher refractive index at a portion closer to the center, and when parallel lights enter these optical fibers, the lights meander and form an image on a specific point. Then, the optical fibers $121_1, 121_2, \ldots, 121_n$ have lengths set so that an image forming position of an erect image is an end surface of each optical fiber.

Even if the optical fibers $121_1, 121_2, \ldots, 121_n$ are arranged so that incident and emission end surfaces of each optical fiber are two-dimensionally placed on one plane as shown in FIG. 30 to form a lens group, the optical fibers do not interfere with each other, and substantially the same advantage can be obtained as in providing an optical barrier. Further, an erect image is obtained on the emission end surface, and thus a correct three-dimensional image can be reproduced rather than a false image with inverted irregularities.

In recent years, distributed refractive index lenses using inexpensive resin material has been developed. A method for fabricating a distributed refractive index lens includes a method for fabricating a distributed refractive index waveguide in a simple process of installation of a mask for adjusting the amount of light and light irradiation using photopolymerization of monomer in an optical medium to change a refractive index (for example, see FIG. 1 of Japanese Patent Laid-Open No. 60-64310).

There is also a method using the photopolymerization reaction as in Japanese Patent Laid-Open No. 60-64310, for fabricating a waveguide type lens having concentric circular refractive index distribution by ultraviolet irradiation from two different directions (for example, see FIG. 1 of Japanese Patent Laid-Open No. 60-175010.

There is also a method using the photopolymerization reaction as in Japanese Patent Laid-Open No. 60-64310, for fabricating an optical waveguide with refractive index distribution by changing the amount of light applied. (for example, see FIG. 1 of Japanese Patent Laid-Open No. 1-134310).

However, as shown in FIG. 30, the configuration in which the optical fibers are arranged in a matrix takes time for alignment of optical axes and is low in productivity and expensive.

For a projector or the like, a heat-resisting lens is required because a projected part is heated to a high temperature, but a resin lens using a conventional photopolymerization reaction has no heat resistance to 80° C. or more, and cannot be used for a projector.

With the conventional fabrication method of the distributed refractive index lens in Japanese Patent Laid-Open No. 60-64310, Japanese Patent Laid-Open No. 60-175010, and Japanese Patent Laid-Open No. 1-134310, a single piece of waveguide type refractive index distribution lens can be fabricated, but one distributed refractive index lens only can be fabricated at a time because of the process with the chemical reaction caused from surroundings.

Thus, producing IP panels using the distributed refractive index lenses fabricated by these conventional fabrication methods requires an assembling step of adjusting optical axes of 10,000 or more distributed refractive index lenses and arranging the lenses in a matrix, and thus the panels are low in productivity. For this reason, even if the resin material is inexpensive, the panels become expensive as in the case of using conventional GRIN lenses made of glass or distributed refractive index optical fibers.

DISCLOSURE OF THE INVENTION

The present invention solves the above described conventional problems and has an object to provide a distributed refractive index lens that is higher in productivity than conventional ones, and a production method of the distributed refractive index lens.

To solve the above problems, the present invention is a distributed refractive index lens comprising a plurality of areas having refractive index distribution, wherein said distributed refractive index lens is a plate-like member containing polysilane, said refractive index distribution of said areas is a distribution that includes a change in a refractive index in a direction parallel to a plane of said plate-like member, and does not include a substantial change in the refractive index in a direction perpendicular to said plane.

Further, another aspect of the present invention is a production method of a distributed refractive index lens including a plurality of areas having a refractive index distribution, comprising:

a polysilane material preparing step of preparing a sheet-like polysilane material to which an oxide is added in a predetermined distribution; and an ultraviolet irradiation step of applying ultraviolet rays having an intensity distribution to said polysilane material to form said refractive index distribution on said polysilane material, wherein said distribution of said oxide is a distribution in which a concentration of said oxide is lower at a part closer to an irradiation surface of said polysilane material to which said ultraviolet rays are applied.

The present invention has an advantage of providing a distributed refractive index lens that is higher in productivity than conventional ones, and a production method of the distributed refractive index lens.

Figure 1:
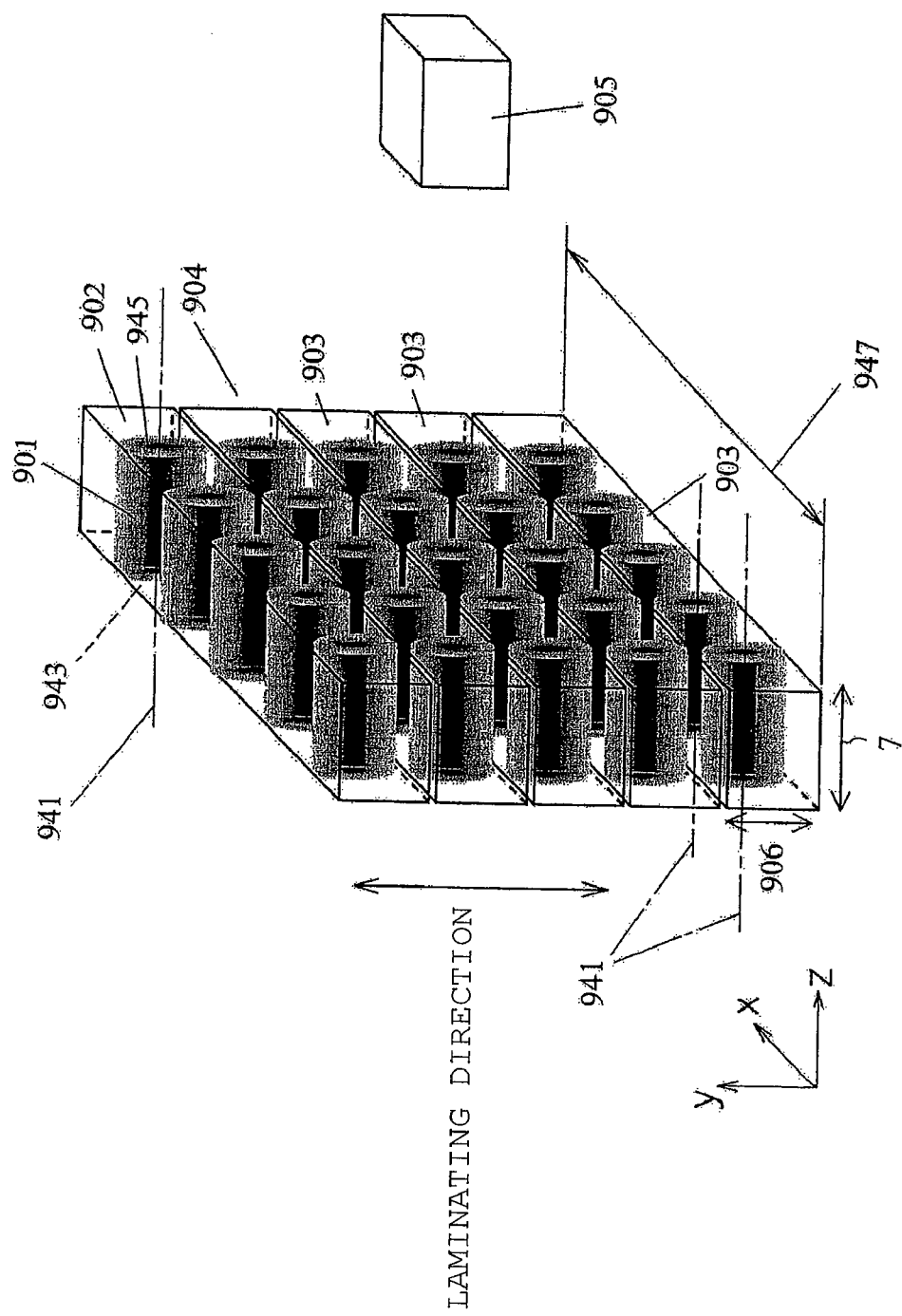
FIG. 1 is a schematic perspective view of a configuration of a three-dimensional image pickup apparatus using a WG type GI lens matrix according to Embodiment 1 of the present invention.

DESCRIPTION OF THE SYMBOLS 1 first transparent substrate
2 second transparent substrate
3 concentric circular distributed refractive index lens part
4 clad part
5 sheet-like polysilane
6 distributed refractive index lens array
7 lens length
8 distributed refractive index lens
9 polysilane structure
10 siloxane structure
11 ultraviolet transmittance distribution first mask
12 ultraviolet transmittance distribution second mask
14 oxide
15 ultraviolet ray (irradiation)
16 concentric circular lens array ultraviolet transmittance distribution mask
17 diffraction grating
18 standing wave
19 distributed refractive index bar lens part
20 distributed refractive index bar lens array (lenticular plate)
21 distributed refractive index bar lens
22 bar lens array ultraviolet transmittance distribution mask
23 diffracted light
201 incident surface
202 emission surface
308 image display portion
901 waveguide type refractive index distribution lens (WG Type GI Lens)
902 clad
903 waveguide type refractive index distribution lens array (WG type GI lens array)
904 waveguide type refractive index distribution lens matrix (WG type GI lens matrix)
905 camera
906 thickness
908 image display portion
909 viewer
910 uncured sheet-like polysilane
910' cured sheet-like polysilane
911 polysilane structure
912 siloxane structure
913 ultraviolet transmittance distribution of mask
914 UV transmittance distribution first mask
915 UV transmittance distribution second mask
916 slab type refractive index distribution lens (slab type GI lens)
917 slab lamination type refractive index distribution lens array (slab lamination type GI lens array)
918 sensor
919 panel drive portion
920 injection opening
921 injection container
922 ultraviolet ray (fixed amount)
923 ultraviolet ray (varying amount)
960 transparent substrate

DETAILED DESCRIPTION OF THE INVENTION

Now, embodiments of the present invention and the invention of a technique relating thereto will be described with reference to the drawings.

Embodiment 1

An embodiment of a distributed refractive index lens according to the present invention, a three-dimensional image pickup apparatus and a three-dimensional image reproduction apparatus using the lens will be herein described.

FIG. 1 is a schematic perspective view for illustrating a configuration of a three-dimensional image pickup apparatus using a waveguide type refractive index distribution lens matrix as an example of the distributed refractive index lens according to the present invention.

Figure 2:
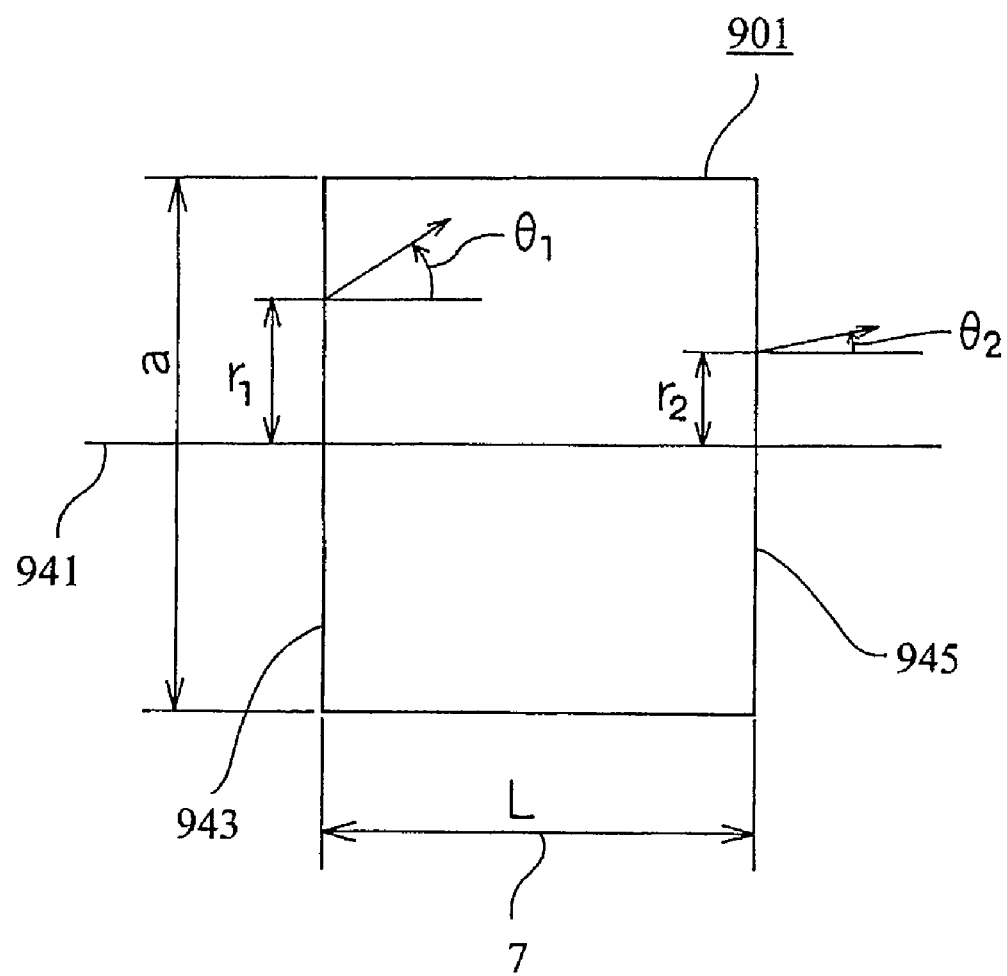
FIG. 2 shows a section of a waveguide type refractive index distribution lens 1, and illustrates an incident beam state and an emission beam state.

FIG. 2 is a schematic view of a section of a waveguide type refractive index distribution lens (core), and shows an incident beam state and an emission beam state.

Figure 3:
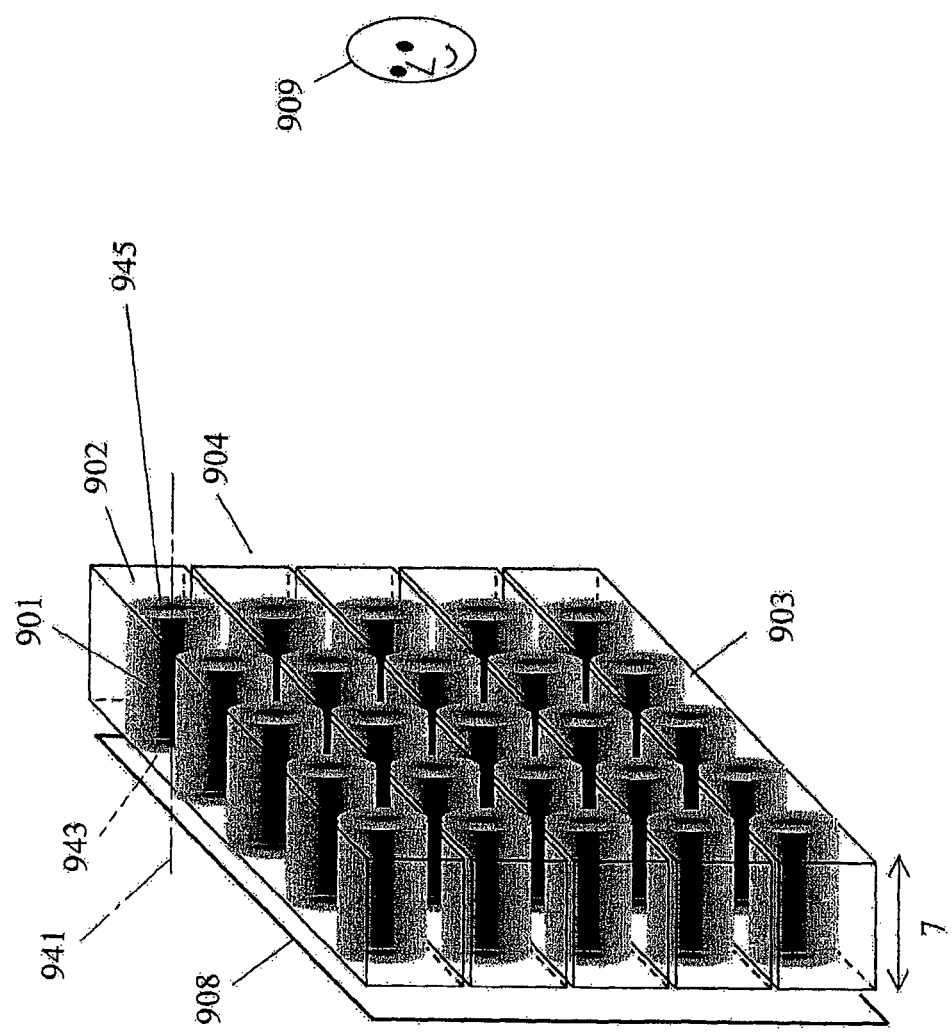
FIG. 3 is a schematic perspective view of a configuration of a three-dimensional image reproduction apparatus using a WG type GI lens matrix according to Embodiment 1 of the present invention.

FIG. 3 is a schematic perspective view of a configuration of a three-dimensional image reproduction apparatus using a waveguide type refractive index distribution lens matrix 904 as an example of the distributed refractive index lens according to the present invention.

First, with reference to FIG. 1, a configuration of the three-dimensional image pickup apparatus according to the embodiment will be described, and a configuration of the distributed refractive index lens will be also described.

The three-dimensional image pickup apparatus according to the embodiment includes a waveguide type refractive index distribution lens matrix 904 (hereinafter also referred to as a WG type GI lens matrix 904), and a camera 905 that picks up the entire image of the waveguide type refractive index distribution lens matrix 904 as shown in FIG. 1.

The WG type GI lens matrix 904 has a structure in which waveguide type refractive index distribution lens arrays (laminating members) 903 are laminated in the direction of a thickness 906 (corresponding to a y-axis in FIG. 1).

Specifically, a waveguide type refractive index distribution lens array 903 (hereinafter also referred to as a WG type GI lens array 903) is a laminating member, and includes a plurality of waveguide type refractive index distribution lenses 901 (also referred to as WG type GI lenses 901), and a polysilane clad 902 in areas other than those having refractive index distribution.

This refractive index distribution is refractive index distribution in which the refractive index becomes maximum on each of a plurality of central axes 941 parallel to a direction of a lamination surface of the WG type GI lens array 903 (corresponding to an x-axis in FIG. 1) and decreases substantially along a parabola according to a distance from each central axis 941.

The laminated WG type GI lens arrays 903 are secured to each other with adhesives at lamination surfaces. The relationship of lengths of the WG type GI lens array 903 along the x-axis (corresponding to a width 947 of the laminating member), the y-axis (corresponding to the thickness 906), and a z-axis (corresponding to a lens length 7) in FIG. 1 are schematically shown, and not limited to these.

The WG type GI lens 901 is a core member having distribution of a siloxane structure that increases according to the distance from the central axis 941 of the WG type GI lens 901 containing a polysilane structure as the main ingredient. The distribution of the siloxane structure is inverted from the above described parabola, and becomes minimum at the central axis 941 and is parabolic symmetrically with respect to the central axis 941 (see FIG. 5(a)). A forming method of the distribution of the siloxane structure will be described later. Opposite end surfaces 943 and 945 of the WG type GI lens 901 are exposed in an incident surface and an emission surface of the WG type GI lens array 903.

The WG type GI lens 901 is an example of "an area having refractive index distribution" of the present invention. The WG type GI lens array 903 is an example of "a laminating member" of the present invention, and the central axis 941 is an example of "a predetermined axis" of the present invention. The WG type GI lens matrix 904 is an example of "a distributed refractive index lens" of the present invention.

Next, the principle of the embodiment will be described.

Generally, input/output characteristics of the refractive index distribution lens are determined by Equation 1. Thus, determining an incident beam state $(r_1, \theta_1)$ and an emission beam state $(r_2, \theta_2)$ allows the shape $(a, L)$ and the refractive index distribution $(n_0, g)$ of the WG type GI lens to be designed as shown in FIG. 2.

Here, $r_1$ and $r_2$ denote displacements of an incident light and an emitted light from the center of the lens (an optical axis). $\theta_1$ and $\theta_2$ denote incident and emission angles of the incident light and the emitted light. $\underline{a}$ denotes a lens diameter (a core diameter substantially equal to a thickness of a WG-GRIN lens), and L denotes a lens length 7. $n_0$ denotes a core refractive index on the optical axis, and g denotes a refractive index distribution constant.

FIG. 2 shows a section of the WG type GI lens 901, and illustrates the incident beam state and the emission beam state.

$$\begin{bmatrix} r_2 \\ \theta_2 \end{bmatrix} = \begin{bmatrix} \cos gL & \frac{1}{n_0 g} \sin gL \\ -n_0 g \sin gL & \cos gL \end{bmatrix} \begin{bmatrix} r_1 \\ \theta_1 \end{bmatrix} \quad \text{[Equation 1]}$$

Next, with Equation 1, the principle of the embodiment will be described in detail with reference to FIG. 2.

An emitted light from a subject away from the WG type GI lens matrix 904 of the embodiment by a distance l (lower-case L) is regarded as an incident light $(r_1 < a, \theta_1 = \tan^{-1}(r_1/l))$ on an incident end surface 943 of the WG type GI lens 901, and thus an emitted light $(r_2, \theta_2)$ on the emission end surface 945 is expressed by Equation 2.

$$\begin{bmatrix} r_2 \\ \theta_2 \end{bmatrix} = \begin{bmatrix} r_1 \cos gL + \tan^{-1}\left(\frac{r_1}{l}\right)\frac{1}{n_0 g}\sin gL \\ -r_1 n_0 g \sin gL + \tan^{-1}\left(\frac{r_1}{l}\right)\cos gL \end{bmatrix} \quad \text{[Equation 2]}$$

From Equation 2, the condition for forming an erect image on the emission end surface 945 of the WG type GI lens 901 ($r_2 = 0$) is Equation 3 (m is an integer).

$$r_1 \cos gL + \tan^{-1}\left(\frac{r_1}{l}\right)\frac{1}{n_0 g}\sin gL = 0 \quad \text{[Equation 3]}$$

$$\Rightarrow \sqrt{r_1^2 + \left\{\tan^{-1}\left(\frac{r_1}{l}\right)\frac{1}{n_0 g}\right\}^2}$$

$$\sin\left[gL + \sin^{-1}\left(\frac{r_1}{\sqrt{r_1^2 + \left\{\tan^{-1}\left(\frac{r_1}{l}\right)\frac{1}{n_0 g}\right\}^2}}\right)\right] = 0$$

$$\Rightarrow gL = m\pi - \sin^{-1}\left(\frac{r_1}{\sqrt{r_1^2 + \left\{\tan^{-1}\left(\frac{r_1}{l}\right)\frac{1}{n_0 g}\right\}^2}}\right)$$

The distance l from the WG type GI lens matrix 904 to the subject is approximately sufficiently large, and Equation 3 approximately becomes Equation 4.

$$gL \approx m\pi - \frac{\pi}{2} \quad \text{[Equation 4]}$$

As seen from Equation 4, as the condition for forming the erect image, g (the refractive index distribution constant) and L (the lens length) may be determined to satisfy Equation 4.

The size of an optical image formed on the emission end surface 945 of the WG type GI lens 901 does not exceed the size of the emission end surface 945, and optical images on the end surfaces of the WG type GI lenses 901 that constitute the WG type GI lens matrix 904 do not interfere with each other.

The shape of the refractive index distribution of the WG type GI lens 901 is strictly expressed in infinite series, but may be approximately parabolic (quadratic function) considering that the shape is axisymmetric with respect to a maximum point of the refractive index (the axis of symmetry herein corresponds to the central axis 941 in FIG. 1) and the possibility of refractive index distribution accuracy in a production process as described with reference to FIG. 1. Of course, controlling the shape of the refractive index distribution in infinite series is better, if possible.

Next, an operation of the three-dimensional image pickup apparatus according to the embodiment will be described.

1. Lights from the subject (not shown) placed a predetermined distance away from the incident end surfaces 943 of the WG type GI lens matrix 904 enter the incident end surfaces 943 of the WG type GI lenses 901, and different erect images of the subject are formed on the emission end surfaces 945 of the WG type GI lenses 901.

2. These erect images are photographed by a camera 905 placed in a position where all the erect images can be photographed.

3. Image data thus obtained is recorded in a predetermined recording medium or transmitted to a reproduction apparatus described later.

Next, with reference to FIG. 3, a configuration of the three-dimensional image reproduction apparatus according to the embodiment will be described, and one configuration of the distributed refractive index lens of the present invention will be also described.

As shown in FIG. 3, the three-dimensional image reproduction apparatus according to the embodiment includes an image display portion 908, a control circuit (not shown) for controlling a display operation of the image display portion 908, and a WG type GI lens matrix 904. The WG type GI lens matrix 904 is the same as that described with reference to FIG. 1, and the same components as in FIG. 1 are denoted by the same reference numerals in FIG. 3.

The image display portion 908 is a display portion of a liquid crystal display apparatus for displaying an image picked up by the camera 905 included in the three-dimensional image pickup apparatus in FIG. 1 correspondingly to each incident end surface 943 of the WG type GI lens matrix 904. The image display portion 8 is adjusted so that each erect image to be displayed on a display surface thereof is displayed on a position corresponding to each incident end surface 943 of the WG type GI lens 901 placed to face the image display portion 908.

The display surface of the image display portion 908 is placed in a focus position of the WG type GI lens 901.

Next, an operation of the three-dimensional image reproduction apparatus according to the embodiment will be described.

1. The control circuit reproduces and displays image data of a plurality of erect images photographed by the camera 905 in FIG. 1 on a predetermined position of the image display portion 908 in FIG. 3.

2. The display position of each erect image corresponds to each WG type GI lens 901, thus lights from these reproduced images enter the incident end surface of each WG type GI lens 901, emit from each emission end surface 945, and enter the eyes of a viewer 909. In this manner, a three-dimensional image is recognized in the brain of the viewer 909.

Specifically, when the viewer 909 views the display surface while changing his/her location in front of the three-dimensional image display apparatus according to the embodiment, recognized images change according thereto. Thus, the viewer 909 can obtain realistic three-dimensional images.

Next, a basic mechanism of a production process of the WG type GI lens 901 made of polysilane described above will be described with reference to FIGS. 4 to 7. In the description, an outline will be described in the former part, and details will be described in the latter part.

Figure 4:
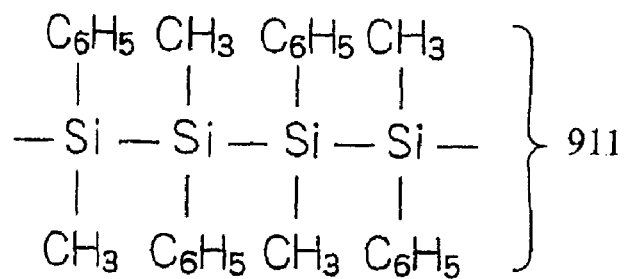
FIG. 4 illustrates fabrication mechanism of a WG type GI lens of sheet-like polysilane according to the embodiment.
Figure 4:
Figure 4:
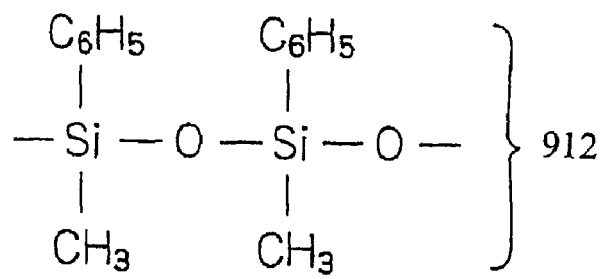

FIG. 4 schematically shows a change of a polysilane structure 911 of uncured polysilane resin by ultraviolet irradiation in a chemical formula.

First, an outline of the basic mechanism will be described as described above.

As shown in FIG. 4, the polysilane structure 911 with a high refractive index changes to a siloxane structure 912 with a low refractive index by an oxidation reaction during curing that is caused by UV (ultraviolet) exposure or heat treatment of uncured polysilane resin (see laminating polysilane 910 in Step 501 in FIG. 5(c)).

Specifically, as shown in FIG. 5(c), describing the uncured laminating polysilane 910, an oxidation reaction occurs from the side irradiated with UV to create a siloxane structure 912.

Thus, as shown in FIG. 5(a), an oxygen concentration increase with distribution of oxygen drawn into the siloxane structure 912 near a surface of the uncured laminating polysilane 910 where many siloxane structures 912 are distributed.

Specifically, the oxygen concentration decreases from the surface of the uncured laminating polysilane 910 on the side of a UV light source toward the center. This means that the siloxane structure 912 with the low refractive index is distributed and formed in proportional to the oxygen concentration described above. In other words, refractive index distribution is formed in which the refractive index decreases from a surface of cured laminating polysilane 910' toward the center (see FIG. 5(b)).

FIG. 5(a) schematically shows changes, according to the amount of UV applied (irradiation intensity and time), in the concentration distribution of the oxygen drawn into the siloxane structure 912 in UV irradiation from opposite sides of the uncured laminating polysilane 910 (see Steps 501 to 503 in FIG. 5(c)). In FIG. 5(a), the axis of abscissa shows the oxygen concentration, and the axis of ordinate shows a distance from the center of the thickness (a y-axis direction in FIG. 5(c)).

FIG. 5(b) schematically shows the content of FIG. 5(a) in terms of changes in refractive index distribution, and also shows a distribution state of the polysilane structure 911. In FIG. 5(b), the axis of abscissa shows the refractive index, and the axis of ordinate shows a distance from the center of the thickness (the y-axis direction in FIG. 5(c)).

For simplicity of description, Y-Y sections of the uncured laminating polysilane 910 and the cured laminating polysilane 910' (see FIG. 5(c)) only are described, but the same applies to X-X sections. Distribution on X-X sections will be described later (see FIG. 7(a)).

In this manner, an area 964 with many polysilane structures 911 that shows a negative correlation with the oxygen concentration distribution and an area 966 with many siloxane structures 912 created by oxidation are distributed, and thus the refractive index distribution can be freely formed according to the way of UV irradiation (see Step 502 in FIG. 5(c)).

When the thickness of the uncured laminating polysilane 910 is small, oxygen in the atmosphere can be consumed. However, when the thickness of the uncured laminating polysilane 910 is large, or the uncured laminating polysilane 910 is placed on a transparent substrate 960 (see FIG. 5(c)) and one side of the uncured laminating polysilane 910 is not directly exposed to air, oxygen, an oxide, a peroxide, or the like is previously diffused in the uncured laminating polysilane 910 besides the oxygen in the atmosphere, thereby allowing refractive index distribution to be formed in the inside which the oxygen in the atmosphere do not reach.

The amount of oxygen supplied (the oxygen concentration) is different between the transparent substrate 960 side and the air side (see FIG. 5(c)). Thus, when the same amount of UV is applied from the opposite sides, the position of the maximum refractive index is moved toward the transparent substrate 960 because of a large decrease in the refractive index on the air side with a large amount of oxygen supplied. However, the amount of UV applied from the transparent substrate 960 side is increased more than in the air side so that the amount of UV applied is asymmetric, and thus the oxidation reaction on the air side is restrained, thereby allowing refractive index distribution symmetric with respect to the center of the thickness to be formed.

Figure 11:
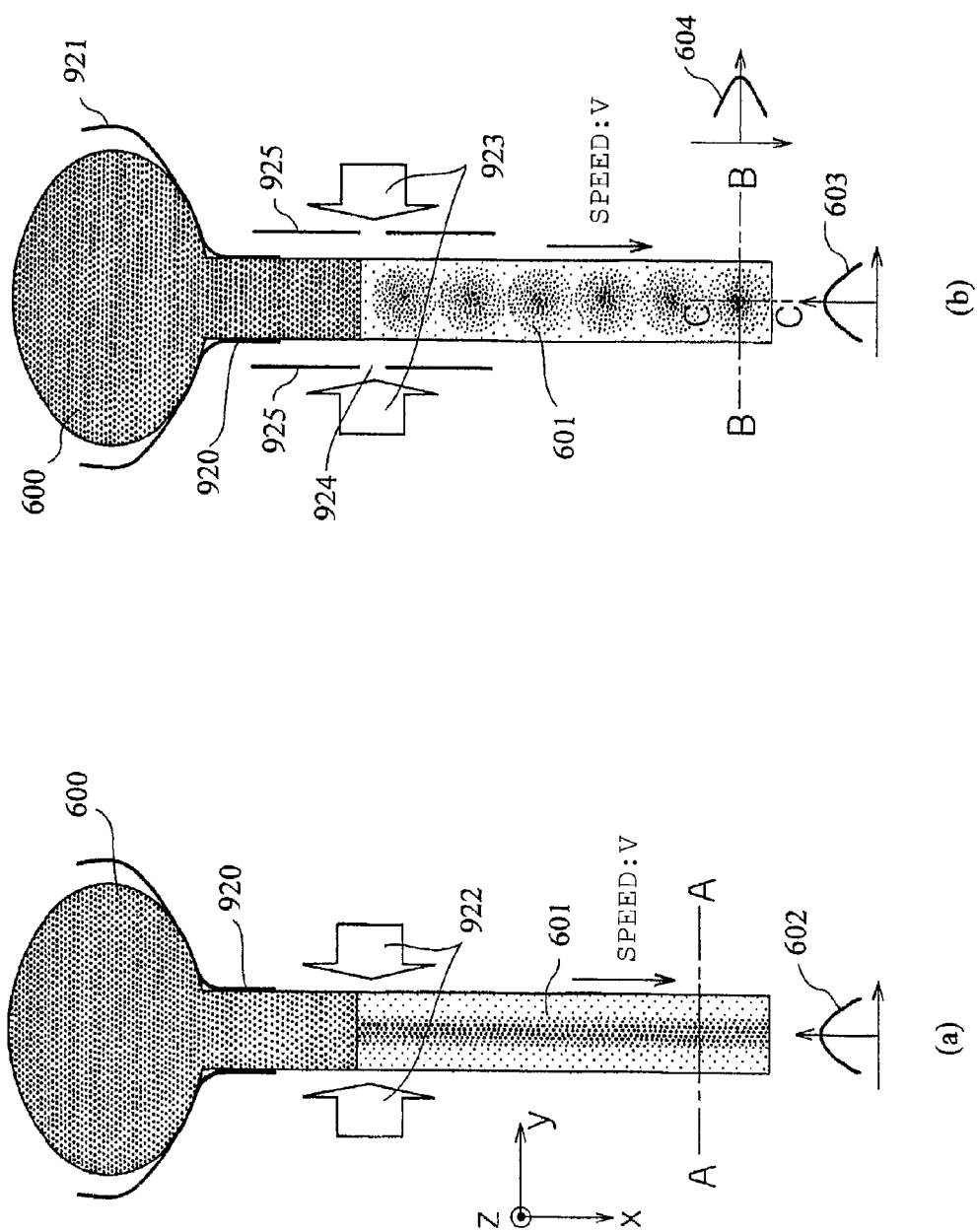
FIG. 11(a) is a conceptual view of a fabrication method of the slab type GI lens with sheet-like polysilane in Embodiment 2.
FIG. 11(b) is a conceptual view of a WG type GI lens array fabrication method with sheet-like polysilane in Embodiment 1.

On the other hand, when refractive index distribution is formed in which the refractive index becomes maximum in the central position in the thickness direction (corresponding to the y-axis direction in FIG. 11) and decreases substantially along a parabola symmetric with respect to the center according to the distance from the center like a GI type slab waveguide (for example, corresponding to polysilane 601 in FIG. 11), UV with the same intensity may be applied from opposite sides of the laminating polysilane (see ultraviolet rays 922 in FIG. 11(*a*)).

In UV exposure from the substrate side for curing, a material transparent to UV, for example, glass such as quartz or borosilicate glass, UV transmissible resin, or a crystalline substrate such as $LiNbO_3$ or $LiTaO_3$ are used as a material for the substrate.

Next, the basic mechanism of the production process specific to the present application will be described in more detail with reference to FIG. 5(*c*).

Figure 5:
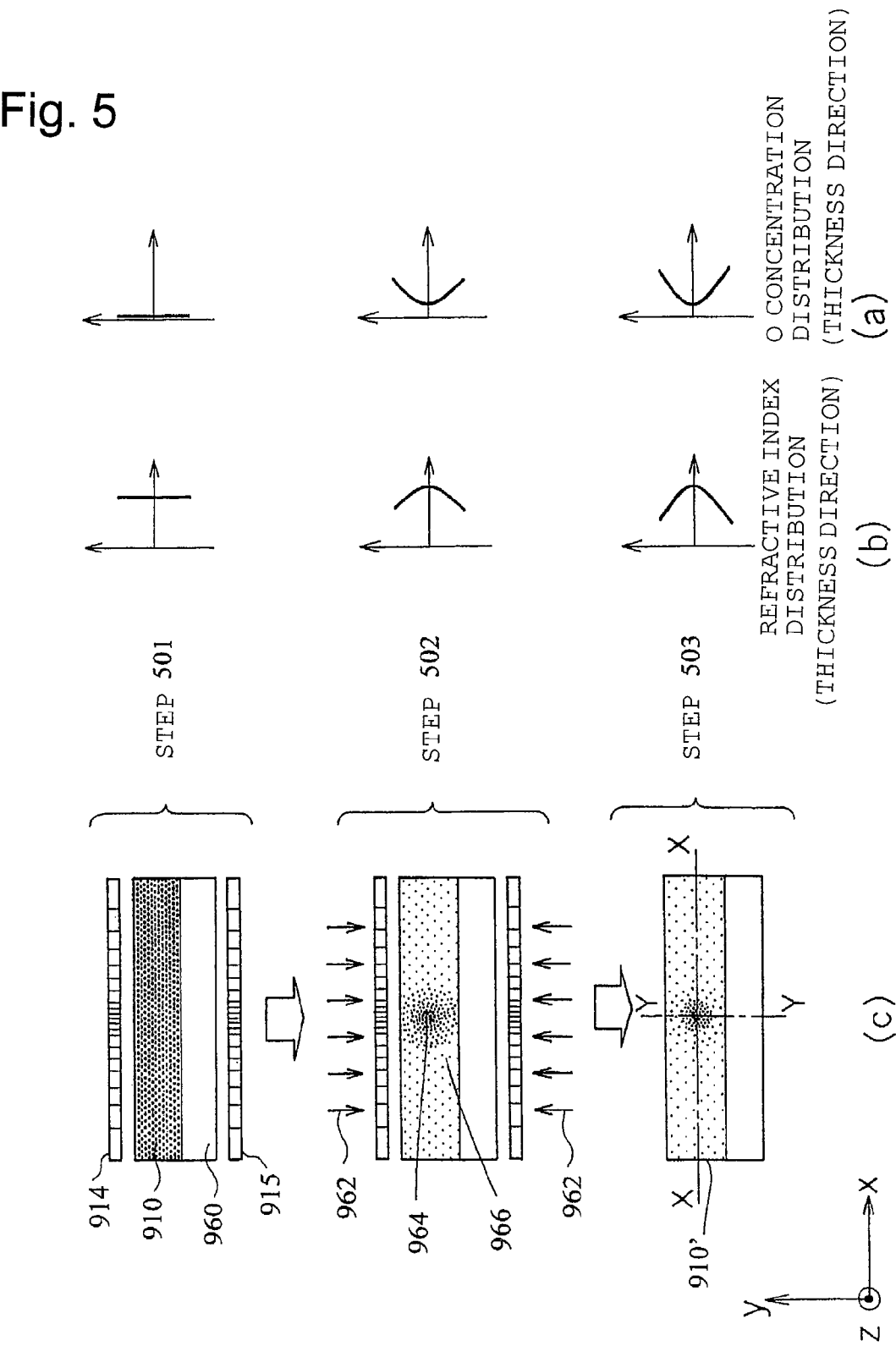
FIG. 5(a) is a graph showing changes, according to the amount of UV applied, in concentration distribution of oxygen drawn into a siloxane structure in UV irradiation from opposite sides of uncured sheet-like polysilane.
FIG. 5(b) is a graph showing the graph in FIG. 5(a) in terms of changes in refractive index distribution, and also showing a distribution state of a polysilane structure.
FIG. 5(c) is a schematic sectional view of changes in distribution of the siloxane structure in each step in UV (ultraviolet ray) irradiation from the opposite sides of the uncured sheet-like polysilane.

FIG. 5(*c*) is a schematic sectional view showing changes in the distribution of the siloxane structure 912 in Steps 501 to 503 in UV (ultraviolet ray) irradiation of the uncured laminating polysilane 910 from opposite sides. In FIG. 5(*c*), the distribution state is schematically shown by the density of dots. Specifically, high density of dots shows an area where many polysilane structures 911 are distributed, and low density of dots shows an area where many siloxane structures 912 are distributed.

First, in Step 501 in FIG. 5(*c*), the uncured laminating polysilane 910 is placed on the transparent substrate 960 that can transmit ultraviolet rays, and a UV transmittance distribution first mask 914 and a UV transmittance distribution second mask 915 are placed on opposite sides thereof. UV irradiation portions (not shown) are placed outside the first mask 914 and the second mask 915.

The first mask 914 and the second mask 915 are previously configured to have different UV transmittance by location. As shown in FIG. 1, a fabrication method of the polysilane WG type GI lens 901 in which the refractive index is two-dimensionally distributed in the direction of the thickness 906 (the y-axis direction in FIG. 1) and the direction of the width 947 of the laminating member (an x-axis direction in FIG. 1) requires the first and second masks 914 and 915 having a predetermined transmittance distribution characteristic shown in FIG. 6.

Figure 6:
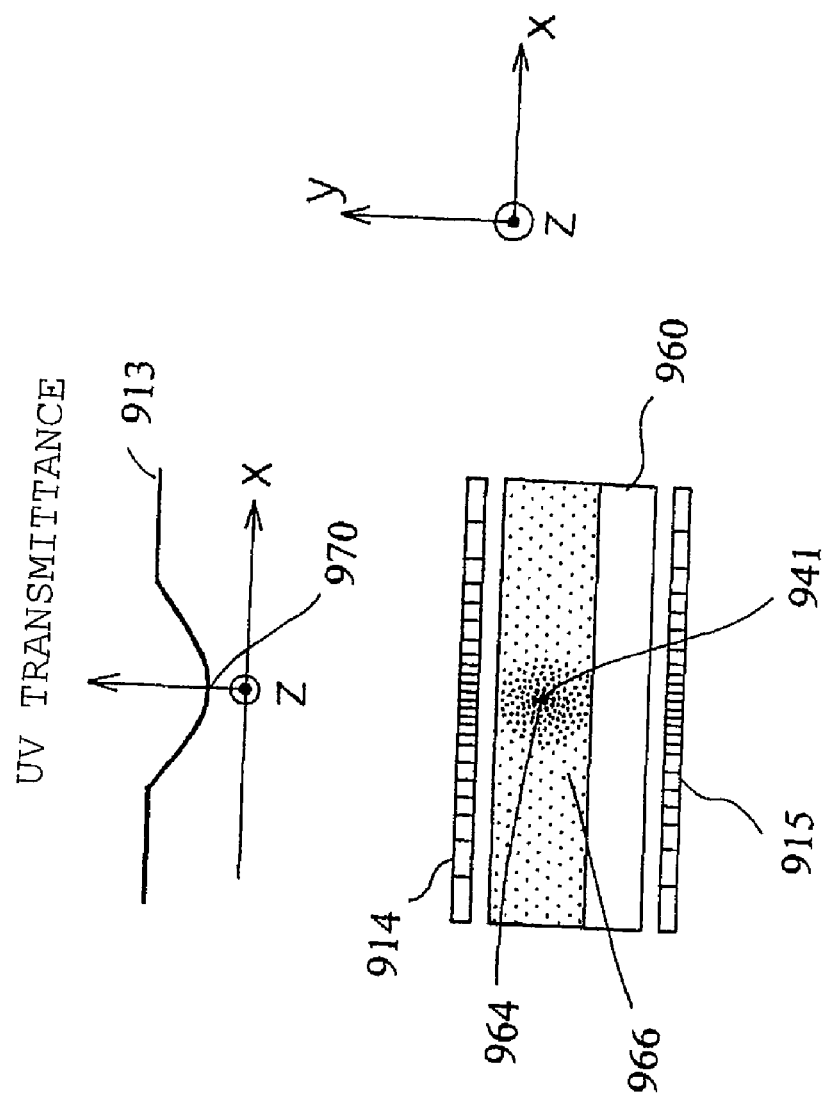
FIG. 6 illustrates a transmittance characteristic of a mask.

UV transmittance distribution 913 of the mask shown in FIG. 6 has a ultraviolet transmittance distribution characteristic in which UV transmittance increases substantially along a parabola symmetric with respect to the axis of ordinate that shows the UV transmittance.

Specifically, as shown in FIG. 6, the UV transmittance of the mask has a minimum part on a line (corresponding to a z-axis direction) parallel to the central axis 941 of a core of the WG type GI lens 901 having a predetermined length (denoted by the lens length (L) 7 in FIG. 1), and increases according to a distance from the minimum part 970 in a direction perpendicular to the parallel line (corresponding to the x-axis direction).

FIG. 6 shows the UV transmittance distribution 913 on any section parallel to an x-y plane of the first and second masks 914 and 915.

For the density showing the refractive index distribution in FIG. 6, the high density shows the high refractive index and the low density shows the low refractive index as described above. For a display manner of the ultraviolet transmittance distribution of the mask, finer line pitches in FIG. 6 show lower transmittance (being hard to transmit ultraviolet ray), and coarser line pitches show higher transmittance (sufficiently transmitting ultraviolet ray).

The description returns to FIG. 5(*c*). In Step 502, a predetermined amount of UV 962 is applied from opposite sides through the first and second masks 914 and 915.

Specifically, the first and second masks 914 and 915 are provided on opposite sides of the uncured laminating polysilane 910, and the uncured laminating polysilane 910 is heated while oxygen is being supplied.

The same amount of ultraviolet ray is uniformly applied from two directions of upside and downside against the uncured laminating polysilane 910 through the first mask 914 and the second mask 915 on the opposite sides each having transmittance distribution, thereby allowing an optical waveguide to be fabricated having refractive index distribution symmetric with respect to the center of the thickness 906 in the thickness direction, and symmetric with respect to the center of the width of the WG type GI lens 901 having a negative correlation with the UV transmittance distribution 913 of the mask in a width direction (corresponding to the direction of the width 947 of the laminating member).

Figure 7:
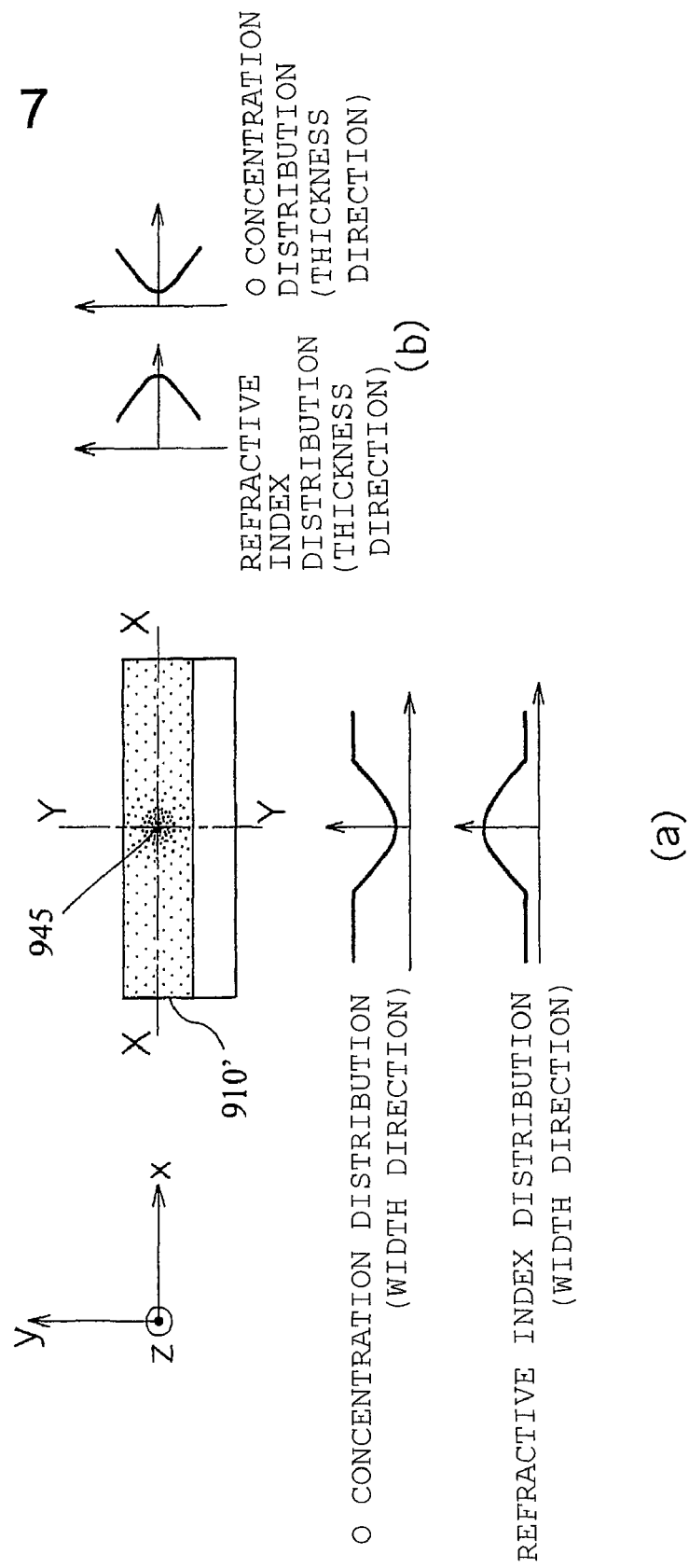
FIG. 7(a) shows distribution states of an oxygen concentration and a refractive index on an X-X section of cured sheet-like polysilane.
FIG. 7(b) shows distribution states of an oxygen concentration and a refractive index on a Y-Y section of the cured sheet-like polysilane.

In other words, an optical waveguide can be fabricated having refractive index distribution in which the refractive index becomes maximum on the central axis 941 (corresponding to the z-axis direction) where the center of the thickness 906 and the center of the width of the WG type GI lens 901 are aligned, and decreases substantially along a parabola symmetric with respect to the center according to the distance from the central axis 941 as shown in FIGS. 7(*a*) and (*b*) (herein simply referred to as distribution symmetric with respect to the center).

FIG. 7(*a*) shows distribution states of the oxygen concentration and the refractive index on the X-X section of the cured laminating polysilane 910'. The axis of abscissa shows a width direction (corresponding to the x-axis direction in FIG. 7(*a*)) of the cured polysilane 910' in FIG. 7(*a*), and the axis of ordinate shows the degrees of various distributions.

On the other hand, FIG. 7(*b*) shows distribution states of the oxygen concentration and the refractive index on the Y-Y section of the cured laminating polysilane 910', which is the same as in FIGS. 5(*a*) and (*b*). The axis of ordinate shows the thickness direction (corresponding to the y-axis direction in FIG. 7(*b*)) of the cured polysilane 9101 in FIG. 7(*b*), and the axis of abscissa shows the degrees of various distributions.

If the distribution is symmetric with respect to the center as described above, the distribution becomes approximately parabolic.

The transmittance of the mask of the clad part 902 in the width direction (corresponding to the direction of the width 947 of the laminating member in FIG. 1) is fixed, and there is strictly refractive index distribution symmetric with respect to the center in the thickness direction of the clad part, but the amount of UV applied is larger in the clad part than in the core part, and the percentage of the siloxane structure is higher, and thus refractive index distribution of the clad part can be ignored as compared with the refractive index distribution of the core part.

When the thickness of the uncured laminating polysilane 910 is large, or the amount of oxygen supplied is vertically asymmetric with the substrate, the refractive index distribution in the thickness direction can be adjusted by previously adding oxygen or an oxide to the uncured laminating polysilane 910 or making the amount of UV applied vertically asymmetric as in the case of the GI type slab waveguide slab.

From the above descriptions, any number of WG type GI lenses 901 of the same level as a diameter (1 mm or less) of an optical fiber can be easily and inexpensively produced by ultraviolet irradiation in any position in the laminating member, using the oxidation reaction caused during curing of the uncured laminating polysilane 910 by ultraviolet irradiation. Thus, the laminating members including the plurality of WG type GI lenses 901 are laminated to allow a three-dimensional image pickup apparatus and a three-dimensional image reproduction apparatus with simple and inexpensive configurations to be produced, and this will be described in detail in Embodiment 3.

According to the embodiment, the distributed refractive index lens having a simple structure in which the laminating members including the plurality of WG type GI lenses are laminated is used, thereby preventing interference between the lenses and allowing a real image to be formed on the lens end surface.

With such a distributed refractive index lens, a particular advantage can be obtained of providing a three-dimensional image pickup apparatus and a three-dimensional image reproduction apparatus that provide realistic three-dimensional images as is conventional (for example, Japanese Patent Laid-Open No. 60-64310).

Embodiment 2

An example of a distributed refractive index lens according to another aspect of the present invention, a three-dimensional image pickup apparatus and a three-dimensional image reproduction apparatus using the lens will be described.

In Embodiment 1, the structure has been described in which different images are formed for any parallaxes in the two-dimensional direction, and the three-dimensional image can be provided to a viewer in any position and also to a plurality of viewers in different positions. Usually, however, the image may be often directed to a viewer in the same position, and in such cases, a configuration of forming different images on the right eye and the left eye of the viewer can be considered as a configuration for obtaining a simple three-dimensional image.

Thus, in the embodiment, an example will be described in which a simple three-dimensional image can be reproduced with a simpler configuration than Embodiment 1.

Figure 8:
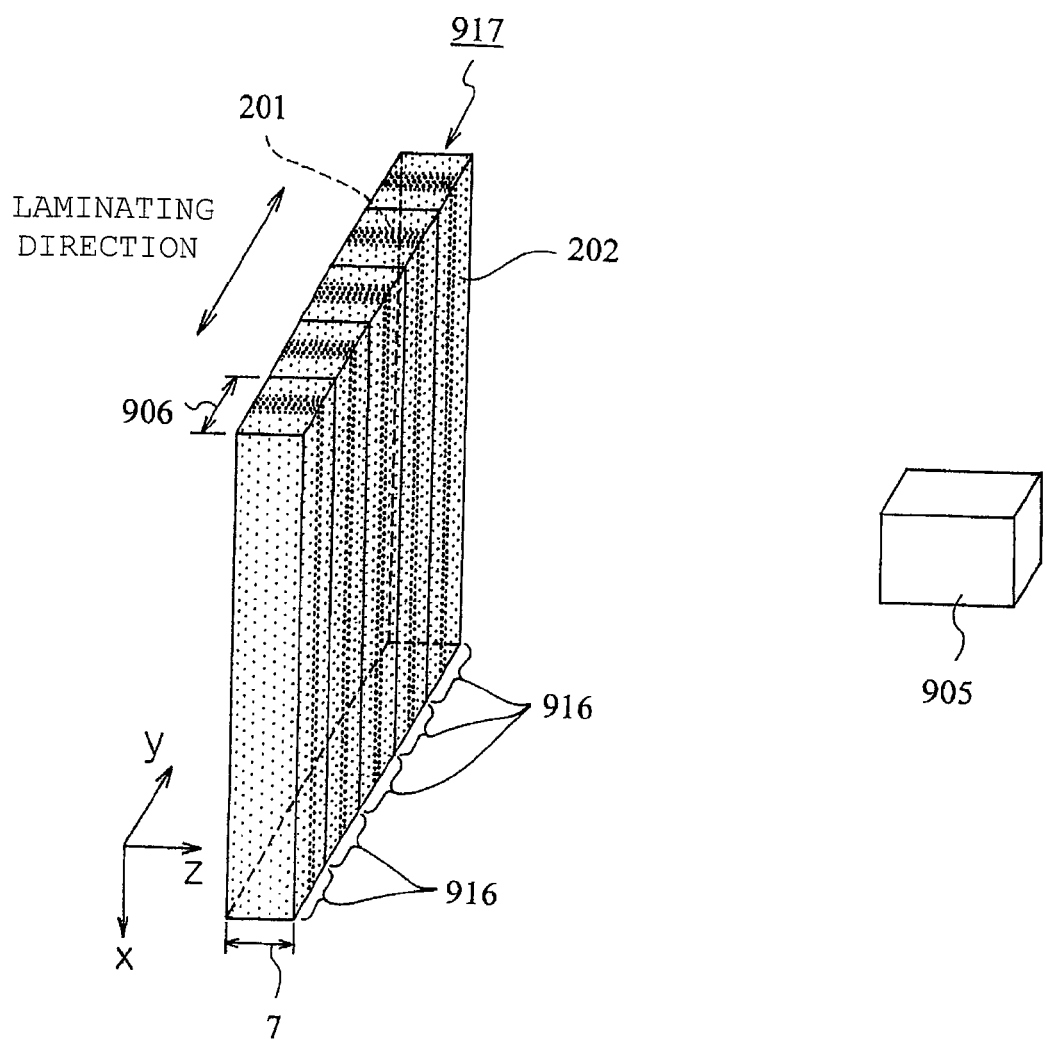
FIG. 8 is a schematic perspective view of a configuration of a three-dimensional image pickup apparatus using a slab lamination type GI lens array according to Embodiment 2 of the present invention.

FIG. 8 is a schematic perspective view for illustrating a configuration of a three-dimensional image pickup apparatus using a slab lamination type refractive index distribution lens array as an example of a distributed refractive index lens according to the present invention.

FIGS. 9(a) and (b) illustrate the principles of configurations of a conventional lenticular plate and the embodiment.

Figure 10:
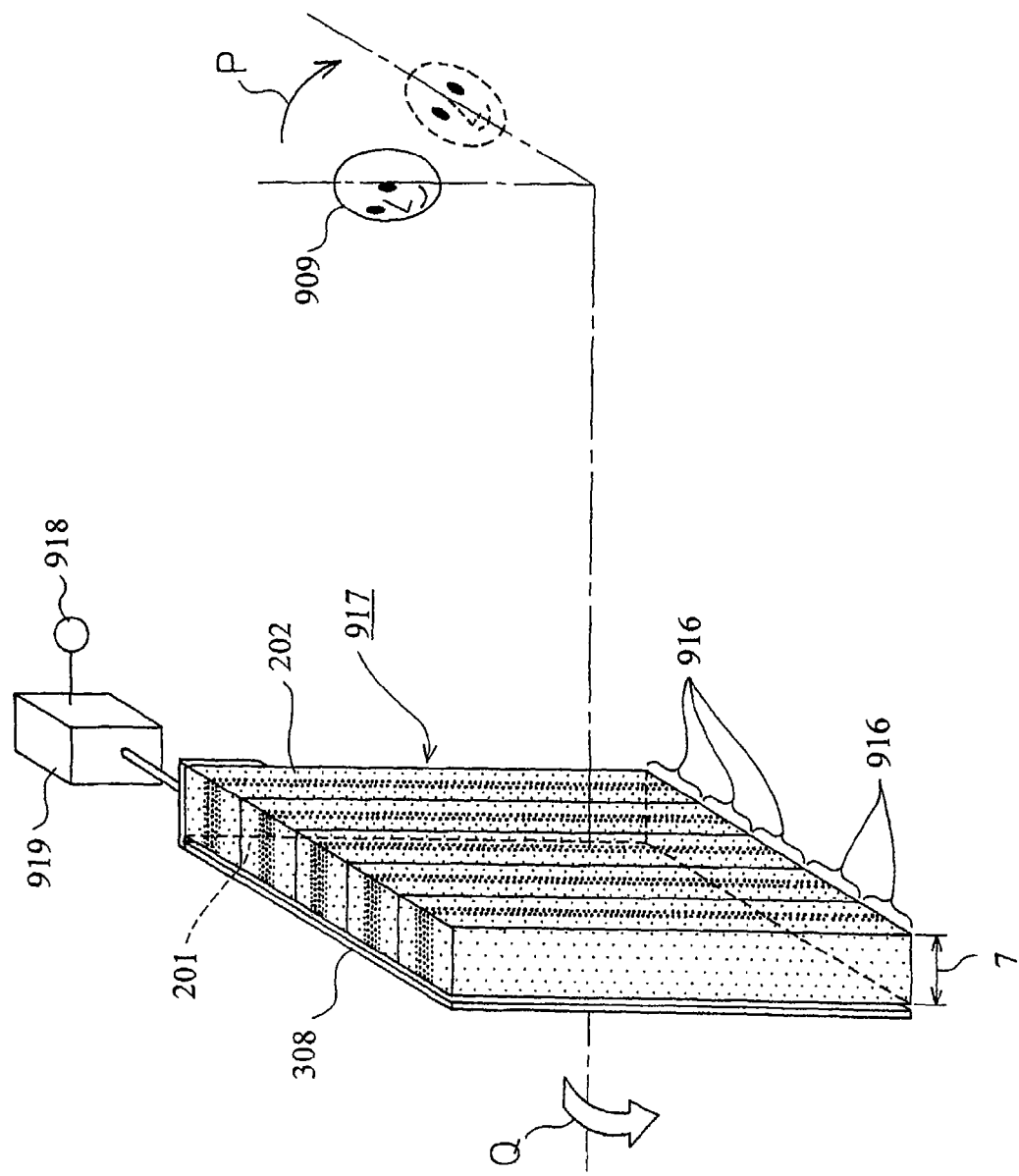
FIG. 10 is a schematic perspective view of a configuration of a three-dimensional image reproduction apparatus using the slab lamination type GI lens array according to Embodiment 2 of the present invention.

FIG. 10 is a schematic perspective view for illustrating a configuration of a three-dimensional image reproduction apparatus using a slab lamination type refractive index distribution lens array as an example of the distributed refractive index lens according to the present invention.

First, with reference to FIG. 8, a configuration of the three-dimensional image pickup apparatus according to the embodiment will be described, and a configuration of the distributed refractive index lens will be also described.

As shown in FIG. 8, the three-dimensional image pickup apparatus according to Embodiment 2 includes a slab lamination type GI lens array 917, and a camera 905 that picks up the entire image of the slab lamination type GI lens array 917.

The slab lamination type GI lens array 917 has a configuration in which a plurality of slab type refractive index distribution lenses (hereinafter also referred to as slab type GI lenses) are laminated in the direction of a thickness 906. The slab type GI lens 916 has refractive index distribution in which the refractive index becomes maximum in the central position of the thickness 906 with reference to a laminating direction (a y-axis direction in FIG. 8) of laminating polysilane and decreases substantially in a parabola according to a distance form the central position.

The refractive index distribution of the slab type GI lens 916 is formed on the basis of oxygen concentration distribution during curing of the laminating polysilane. This will be described later.

The laminated slab lamination type GI lens arrays 917 are secured to each other with adhesives at lamination surfaces. The relationship of lengths of the slab lamination type GI lens array 917 along an x-axis, the y-axis (corresponding to the thickness 906), and a z-axis (corresponding to a lens length 7) in FIG. 8 are schematically shown, and not limited to these.

The slab type GI lens 916 is an example of "a laminating member having predetermined refractive index distribution" of the present invention. The slab lamination type GI lens array 917 is an example of "a distributed refractive index lens" of the present invention.

The slab lamination type GI lens array 917 of the embodiment has the same function as a conventional lenticular plate. This will be now described with reference to FIGS. 9(a) and (b).

The embodiment can be regarded as a simple type of Embodiment 1.

Specifically, the principle described in Embodiment 1 is dealt with in a one-dimensional manner, thereby allowing different images to be formed for any parallaxes in a one-dimensional direction (generally, a lateral direction).

As described above, the embodiment is essentially based on the same principle as that for obtaining a three-dimensional image with the conventional lenticular plate, but has a completely different configuration. Thus, the principle of obtaining a three-dimensional image of a simple type with the configuration of the embodiment will be described in detail, comparing with the principle of the lenticular plate.

First, with reference to FIG. 9(a), the principle of forming different images for parallaxes in a one-dimensional direction using the conventionally known lenticular plate will be briefly described.

FIG. 9(a) is a sectional view of a conventional lenticular plate 101 having a surface with a row of semicircles, and schematically shows the principle of image forming.

In FIG. 9(a), incident angles of parallel lights 103 and 105 emitted from a subject (not shown) correspond to parallaxes and are denoted by $\theta_R$ and $\theta_L$ relative to a normal line 113 of a bottom surface 107. A distance between a top 111 of a surface of a semicircular convex lens and the bottom surface 107 is denoted by L. A point where the normal line 113 passing the middle between focus positions 109R and 109L crosses the top 111 of the semicircular convex lens is an incident point 115.

As shown in FIG. 9(a), the parallel light 103 to enter the right eye and the parallel light 105 to enter the left eye in reproduction of images among emitted lights from the subject (not shown) placed in front of the lenticular plate 101 focus on the different positions 109R and 109L on the bottom surface 107 with the parallaxes.

The lights from the subject having passed through the lenticular plate 101 are divided into the light for the left eye and the light for the right eye on the bottom surface 107 in FIG. 9(a), and form a plurality of images divided in a vertically elongated manner, and the plurality of images are photographed by an image pickup apparatus. Then, the obtained images are placed in a line on the bottom surface 107 of the lenticular plate 101 of the three-dimensional image reproduction apparatus, and viewed from the side of the semicircular convex lens, thereby allowing three-dimensional viewing of the subject.

FIG. 9(b) schematically illustrates the principle of the embodiment. The same components as in FIG. 9(a) will be denoted by the same reference numerals.

The light equation of a GRIN lens is expressed by Equation 1 as described in Embodiment 1.

$$\begin{bmatrix} r_2 \\ \theta_2 \end{bmatrix} = \begin{bmatrix} \cos gL & \frac{1}{n_0 g}\sin gL \\ -n_0 g \sin gL & \cos gL \end{bmatrix} \begin{bmatrix} r_1 \\ \theta_1 \end{bmatrix}$$ [Equation 1]

The letters used herein are as described above.

For the convex lens, gL=mπ+π/2 (m: integer) is assigned to Equation 1 to obtain Equation 5, which is a conversion equation for an angle and a position.

$$\begin{bmatrix} r_2 \\ \theta_2 \end{bmatrix} = \begin{bmatrix} 0 & \frac{1}{n_0 g} \\ -n_0 g & 0 \end{bmatrix} \begin{bmatrix} r_1 \\ \theta_1 \end{bmatrix}$$ [Equation 5]

$$= \begin{bmatrix} \theta_1/n_o g \\ -r_o g r_1 \end{bmatrix}$$

Thus, image forming positions on an emission surface 202 of lights 103 and 105 entering the same incident point 115 (see FIG. 9(b)) on an incident surface 201 with different incident angles $\theta_L$ and $\theta_R$ with parallaxes can be expressed by Equation 6.

$r_R = \theta_R/n_0 g$ $r_L = \theta_L/n_0 g$  [Equation 6]

The value of θ is positive in a counterclockwise direction and negative in a clockwise direction.

As seen from FIG. 9(b), these image forming positions $r_R$ and $r_L$ are divided into a positive area and a negative area with the normal line 113 in the center of the lens therebetween.

As can be understood from the above description, the slab lamination type GI lens array 917 is used as a GRIN lens corresponding to a convex lens to achieve the same function as the conventional lenticular plate.

Next, description will be made of an operation of the three-dimensional image pickup apparatus of the embodiment that can form different images for any parallaxes in the one-dimensional direction (generally the lateral direction) on the basis of the above described principle.

1. As shown in FIG. 8, the lights 103 and 105 (see FIG. 9(b)) from the subject (not shown) placed a predetermined distance away from the incident surface 201 of each slab type GI lens 916 enter the incident surface 201. The incident lights form a pair of different erect images on different positions (the positions of $r_L$ and $r_R$ in FIG. 9(b)) on the emission surface 202 of each slab type GI lens 916 as described with reference to FIG. 9(b).

For simplicity of the description, the subject is placed right in front of the slab lamination type GI lens array 917, and an example of the lights entering the slab type GI lens 916 at the center among the lights from the subject is described. It is understood that an infinite number of other lights with tilted normal lines 113 also enter. The same applies to lights entering another slab type GI lens 916.

2. These erect images are photographed by the camera 905 placed in a position where all the erect images can be photographed.

3. Image data thus obtained is recorded in a predetermined recording medium or transmitted to a reproduction apparatus described later.

Next, with reference to FIG. 10, a configuration of the three-dimensional image reproduction apparatus of the embodiment will be described, and a configuration of the distributed refractive index lens will be also described.

As shown in FIG. 10, the three-dimensional image reproduction apparatus of the embodiment includes an image display portion 308 and a slab lamination type GI lens array 917. The slab lamination type GI lens array 917 is the same as described with reference to FIG. 8, and the same components as in FIG. 8 are denoted by the same reference numerals in FIG. 10.

The image display portion 308 is a display portion of a liquid crystal display apparatus for displaying an image picked up by the camera 905 shown in FIG. 8 in a position having a predetermined correlation with an incident surface 201 of the facing slab lamination type GI lens array 917 in a surface of the display portion. The image display portion 308 is adjusted so that a pair of lateral erect images to be displayed on the display surface are displayed in positions corresponding to incident surfaces 201 of facing slab type GI lenses 916.

As an example, describing the display of an image formed by the slab type GI lens 916 at the center in FIG. 8, an infinite number of lateral pairs of erect images are displayed in a laterally divided manner. The same applies to the display of images formed by slab type GI lenses 916 in other positions.

Figure 9:
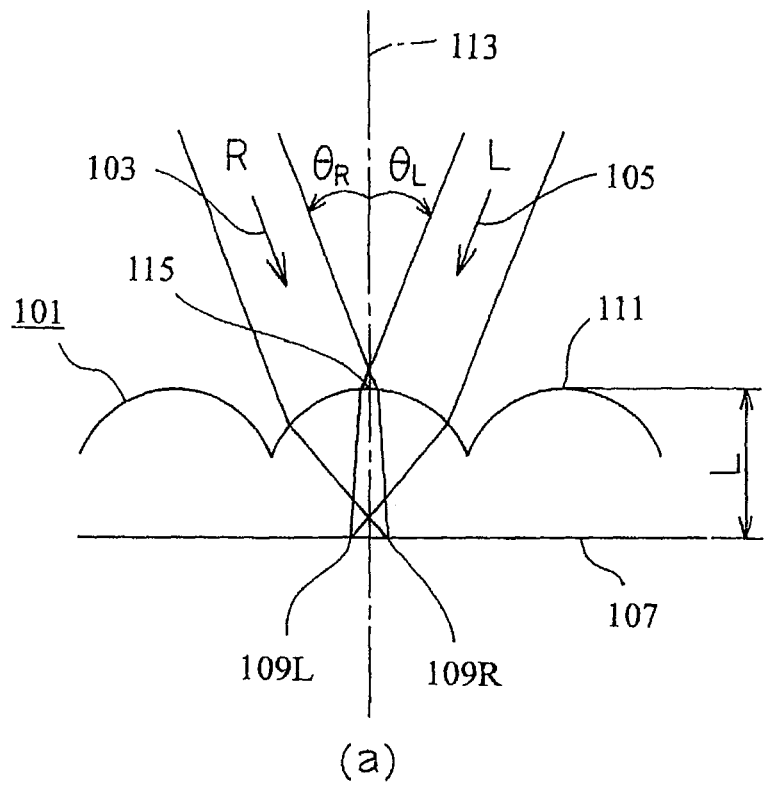
FIG. 9(a) illustrates the principle of a conventional lenticular plate.
FIG. 9(b) illustrates the principle of a slab type GI lens according to Embodiment 2 of the present invention.
Figure 9:
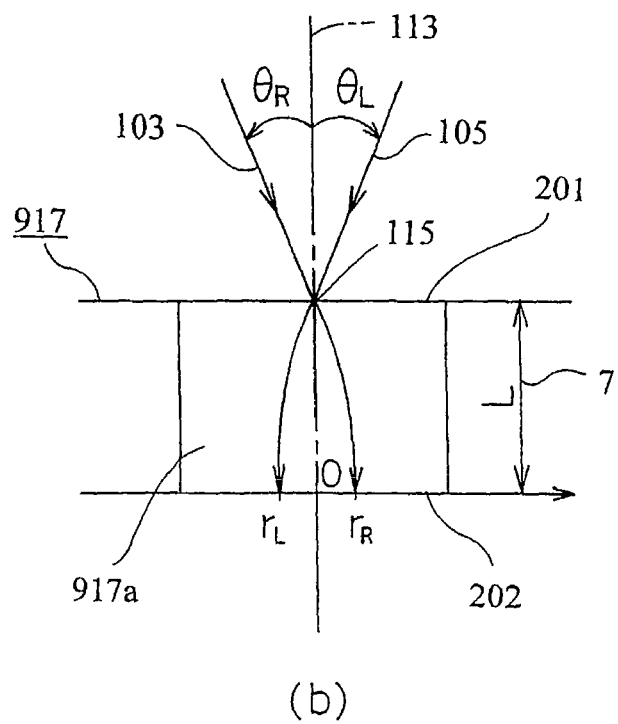

These images include the pairs of erect images (see $r_L$ and $r_R$ in FIG. 9(b)) laterally divided with the normal line 113 therebetween as described with reference to FIG. 9, and for example, as shown in FIG. 10, when a viewer vertically views the display surface of the three-dimensional image display apparatus, lights from each pair of erect images divided with the normal line 113 therebetween among lights emitted from the entire display surface enter the eyes.

When the viewer 909 diagonally views the display surface, lights according to the tilt among the lights emitted from the entire display surface enter the eyes.

Next, an operation of the three-dimensional image reproduction apparatus of the embodiment will be described.

Image data of the plurality of erect images photographed by the camera 905 in FIG. 8 are reproduced and displayed on a predetermined position of the image display portion 308 in FIG. 10.

The display position of each erect image corresponds to each slab type GI lens 916, and lights from the reproduced images enter the incident surface 201 (corresponding to reference numeral 202 in FIG. 9(b)) of the slab type GI lens 916. Then, lights emitted from each emission surface 202 (corresponding to reference numeral 201 in FIG. 9(b)) by the principle opposite to that in FIG. 9(b) (specifically, an advancing direction of the light being opposite) enter the right and left eyes of the viewer 909. In this case, the lights entering the right and left eyes of the viewer 909 are the pair of lights emitted from the emission surface 202 of each slab type GI lens 916 and divided into the light for the right eye and the light for the left eye.

The light for the right eye and the light for the left eye thus having entered the right and left eyes are recognized as a three-dimensional image in the brain of the viewer 909.

Specifically, when the viewer 909 laterally moves his/her face and views the surface of the slab lamination type GI lens array 917 in front of the three-dimensional image display apparatus of the embodiment in FIG. 10, recognized images change according thereto. Unlike the case in Embodiment 1, however, the recognized images do not change if the viewer vertically moves his/her face.

Thus, the viewer 909 can easily obtain realistic three-dimensional images.

For the embodiment, however, if the position of the viewer 909 (the position of the face) is tilted during viewing (see the arrow P in FIG. 10), three-dimensional images cannot be reproduced in principle.

Then, as shown in FIG. 10, there are further provided a sensor 918 that detects the position of the viewer 909 (the tilt of the face or the like), and a panel drive portion 919 for rotating the slab lamination type GI lens array 917 with the movement of the viewer 909 according to an output from the sensor 918.

Specifically, when the sensor 918 detects the tilt of the face of the viewer (see the arrow P in FIG. 10), the panel drive portion 919 having received a detection signal is tilted by a predetermined angle according to the tilt of the face of the viewer (see the arrow Q in FIG. 10).

With such a configuration, three-dimensional images can be reproduced regardless of position changes such as the tilt of the face of the viewer.

The production principle of the slab type GI lens of the embodiment uses an oxidation reaction caused by ultraviolet irradiation of laminating polysilane as described with reference to FIG. 4.

Specifically, ultraviolet irradiation (see FIG. 11(a)) of the laminating polysilane allows the slab type GI lens 916 of the same level as a diameter of an optical fiber to be easily and inexpensively produced in the thickness direction of the laminating member.

Thus, the slab type GI lenses 916 are laminated to allow the slab lamination type GI lens array 917 to be easily and inexpensively produced, and the production method will be described in detail in next Embodiment 3.

According to the embodiment, the distributed refractive index lens having a simple structure with the laminated slab type GI lenses 916 is used, thereby preventing interference between the lenses and allowing a real image to be formed on the lens end surface.

With such a distributed refractive index lens, a particular advantage is established of providing a three-dimensional image pickup apparatus and a three-dimensional image reproduction apparatus that provide realistic and simple three-dimensional images to the same as or higher level than the case of using a conventional lenticular plate with a novel configuration.

Embodiment 3

Next, an embodiment of a production method of a distributed refractive index lens according to the present invention will be described with reference to the drawings.

First, a production method of the slab lamination type GI lens array 917 described in Embodiment 2 will be described, and then, a production method of the WG type GI lens matrix 904 described in Embodiment 1 will be described, with reference to FIGS. 11(a) to 13.

FIG. 11(a) is a conceptual view of an example of a mass production method of the slab type GI lens 916. FIG. 11(b) is a conceptual view of an example of a mass production method of the WG type GI lens array 903.

First, as the mass production method of the slab type GI lens 916, as shown in FIG. 11(a), uncured polysilane 600 is stored in an injection container 921 having an injection opening 920 with a width corresponding to a desired thickness, and laminating polysilane with the desired thickness is injected from the injection opening 920 at a fixed speed V (a first step).

In the injection process, ultraviolet rays 922 with a fixed intensity are applied from two thickness directions (opposite sides) as shown in FIG. 11(a) (a second step). FIG. 11(a) schematically shows refractive index distribution 602 on an A-A section of laminating polysilane 601 after the ultraviolet irradiation. The axis of abscissa shows a position corresponding to a width direction of the A-A section (a y-axis direction in FIG. 11(a)), and the axis of ordinate shows the value of a refractive index.

Then, the ultraviolet irradiation is finished, the laminating polysilane 601 formed with the refractive index distribution 602 is cut into a desired length (not shown), and the cut pieces are laminated (not shown) in the thickness direction (the y-axis direction in FIG. 11(a)) with adhesives (a third step), thereby allowing mass production of the slab lamination type GI lens array 917.

The uncured polysilane in the embodiment is an example of "a base material containing polysilane as the main ingredient" of the present invention.

Next, the mass production method of the WG type GI lens matrix 904 will be described with reference to FIG. 11(b).

As shown in FIG. 11(b), a step of injecting uncured polysilane with a desired thickness at a fixed speed (a first step) and a cutting and laminating step after fabrication of the laminating WG type GI lens array 903 (a third step) are essentially the same as the mass production method of the above described slab type GI lens 916, but a ultraviolet irradiation step (a second step) is significantly different.

Figure 12:
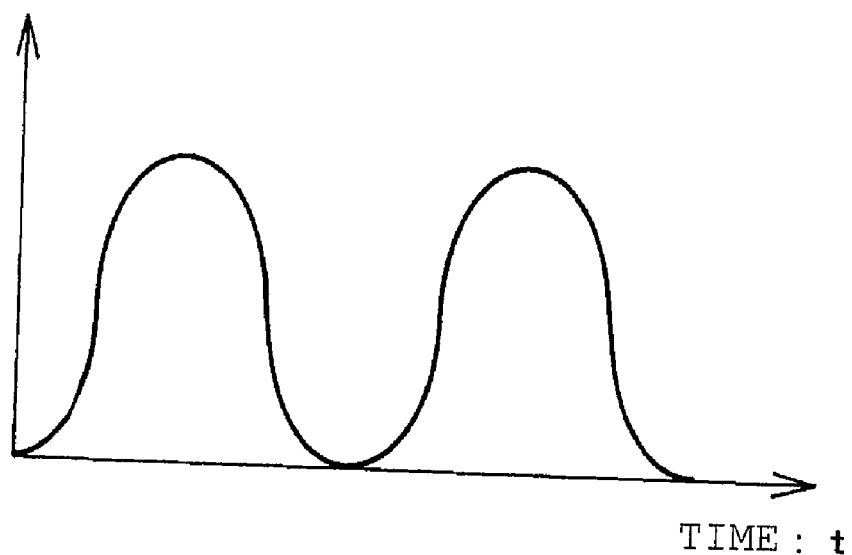
FIG. 12 illustrates ultraviolet irradiation that periodically varies relative to time in Embodiment 3 of the present invention.

Specifically, as shown in FIG. 11(b), for the WG type GI lens array 903, ultraviolet irradiation is performed in which the amount of ultraviolet rays 923 applied to the laminating polysilane injected at a fixed speed V in the thickness direction in a passing specific area is periodically varied relative to time (see FIG. 12).

The laminating step is also different from that in FIG. 11(a) in that precise alignment with markers is required. Specifically, in this case, for example, using markers (not shown) previously assigned to the WG type GI lens arrays 903 in the cutting step, the WG type GI lens arrays 903 need to be laminated so that the central axes 941 of the WG type GI lenses 1 are precisely aligned with reference to the laminating direction (the y-axis direction in FIG. 1) during lamination.

As a limiting method of the specific area to which the ultraviolet rays 923 are applied, masks 925 having openings 924 in the specific area are provided to face each other in the thickness direction.

FIG. 11(b) schematically shows refractive index distribution 603 on a B-B section of the laminating polysilane 601 after the ultraviolet irradiation, and schematically shows refractive index distribution 604 on a C-C section. In FIG. 11(b), the axis of abscissa of the refractive index distribution 603 corresponds to the thickness direction (the y-axis direction in FIG. 11(b)) in the B-B section, and the axis of ordinate corresponds to the value of a refractive index. In FIG. 11(b), the axis of ordinate of the refractive index distribution 604 corresponds to the width direction (the x-axis direction in FIG. 11(b)) of the laminating member in the C-C section, and the axis of abscissa corresponds to the value of a refractive index.

Figure 13:
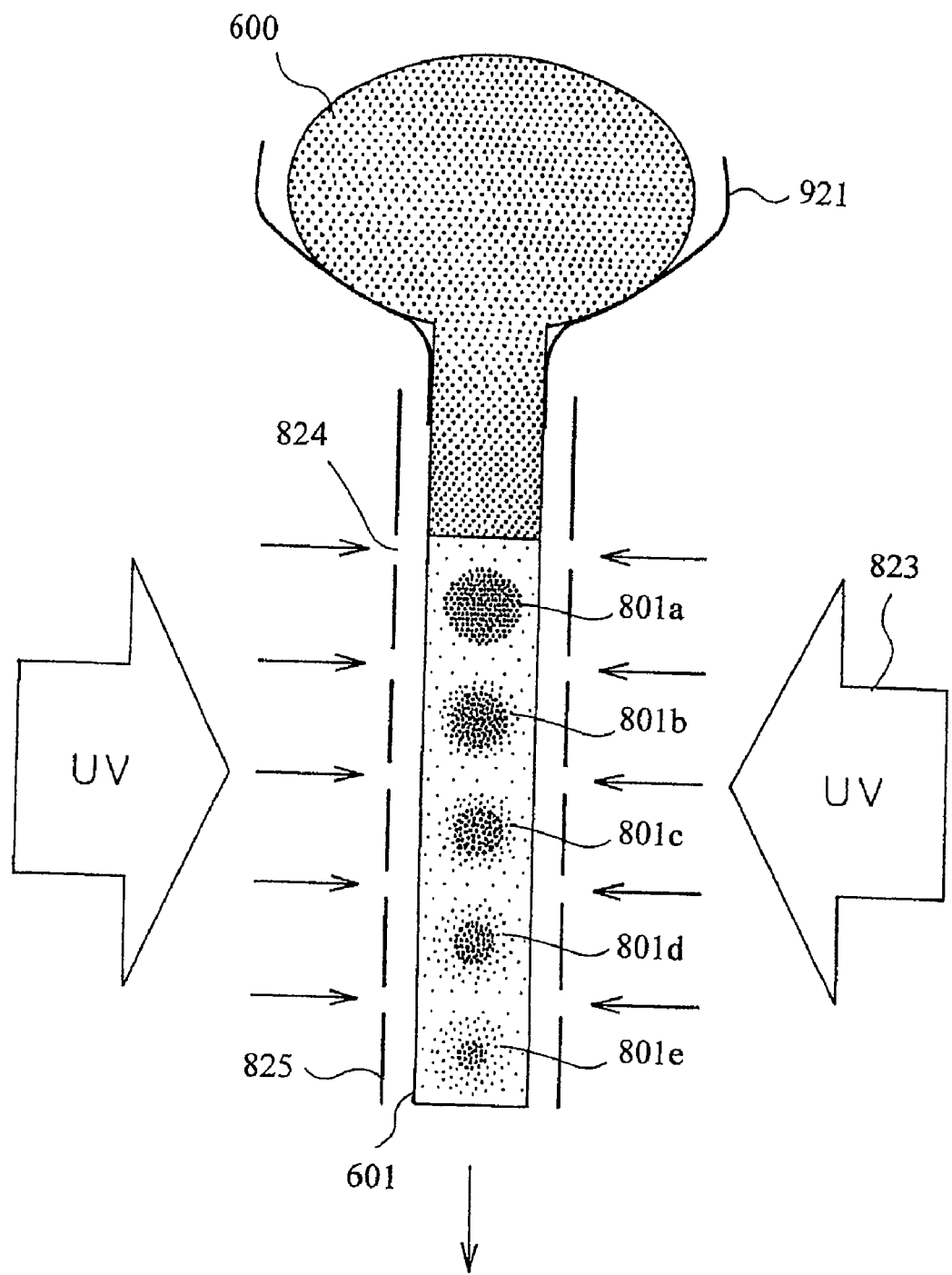
FIG. 13 is a conceptual view of another example of the WG type GI lens array fabrication method with the sheet-like polysilane in FIG. 11(b)

Further, as shown in FIG. 13, the configuration may be such that masks 825 having a plurality of openings in an injection direction are used to perform ultraviolet irradiation in which the amount of ultraviolet rays 823 applied in the thickness direction is periodically varied relative to time as described above (see FIG. 12).

In this case, for first to fifth distribution areas 801a to 801e, the amount of ultraviolet rays applied is accumulated in this order, and desired refractive index distribution can be finally obtained in the fifth distribution area 801e. If the intensity of the ultraviolet rays applied is the same as in FIG. 11(b), the injection speed can be increased more than V, thereby increasing productivity.

As the method for periodically varying the intensity of the ultraviolet rays, besides the above described method, as shown in FIG. 6, the amount of ultraviolet rays transmitted (transmittance) of the mask may be varied with a fixed amount of ultraviolet rays. When the mask is used, an extrusion timing of the uncured polysilane 600 is intermittent rather than continuous as described above.

In the production method in which the laminating polysilane with a fixed thickness is continuously or intermittently injected at a fixed speed for ultraviolet irradiation, the transparent substrate 960 in FIG. 5 is not required, and fabrication of the laminating member of polysilane and fabrication of the refractive index distribution lens by ultraviolet irradiation can be simultaneously performed, thereby reducing costs.

As described above, the distributed refractive index lens of the present invention is useful as a device for optical communications like, for example, an optical fiber, and can provide a device that is higher in productivity than the conventional optical fiber or the like.

The three-dimensional image pickup apparatus and the three-dimensional image reproduction apparatus of the present invention use the principle of integral photography, and are useful as a three-dimensional image pickup apparatus and a three-dimensional image reproduction apparatus that are high in productivity and inexpensive.

The distributed refractive index lens of the present invention has been described as the WG type GI lens matrix in which the WG type GI lens arrays are laminated and secured with adhesives in the embodiment, but not limited to this, for example, WG type GI lens arrays may be laminated, which may be mechanically secured by a frame that surrounds an outer peripheral edge.

The display instrument of the present invention has been described as the display portion of the liquid crystal display apparatus in the embodiment, but not limited to this, for example, may be an image display portion (such as a screen) of a projection type display apparatus. The type of the image is not limited to a moving image, but may be a static image such as a steel picture or a computer graphic image. Specifically, the configuration of the display instrument and the type of the image are not limited as long as they can provide an image formed for three-dimensional display that can be recognized as a three-dimensional image by the viewer. Thus, it is understood that the image itself to be reproduced may be an image photographed by a conventional device.

The distributed refractive index lens of the present invention is configured so that the erect image of the subject is formed on the emission surface when used in the three-dimensional image pickup apparatus of the embodiment. However, when used in the three-dimensional image reproduction apparatus, not limited to the erect image, but any image may be formed as long as the viewer can recognize the image as a three-dimensional image. For example, for a configuration in which an inverted image is formed, a normal/inverted view conversion optical system such as a convex lens is placed between the distributed refractive index lens in the three-dimensional image reproduction apparatus and the viewer, thereby allowing the three-dimensional image to be easily recognized.

In the embodiment, the case where the present invention is applied to both the three-dimensional image pickup apparatus and the three-dimensional image reproduction apparatus has been described, but not limited to this, for example, the present invention may be applied to any one of the apparatuses, and for the other apparatus, an apparatus in which a plurality of lenses using optical fibers having distribution similar to the above described refractive index distribution are arranged in a matrix (for example, the device disclosed in Japanese Patent Laid-Open No. 10-150675) or other conventional apparatuses may be used to reproduce a three-dimensional image as a whole. The three-dimensional image to be reproduced is not limited to a moving image, but may be a static image, or any kind of image.

In the embodiment, the case where the laminating polysilane with the fixed thickness is injected at the fixed speed for ultraviolet irradiation without using a transparent substrate has been described, but not limited to this, for example, laminating polysilane previously formed to have a predetermined length and a fixed thickness may be placed on a transparent substrate (see FIG. 5), and ultraviolet rays may be applied from opposite sides.

In the embodiment, the case where the distributed refractive index lens of the present invention is fabricated by laminating the laminating polysilane has been mainly described. Now, the case where a refractive index type distribution lens of the present invention is fabricated using one piece of sheet-like polysilane will be mainly described.

Embodiment 4

Figure 14:
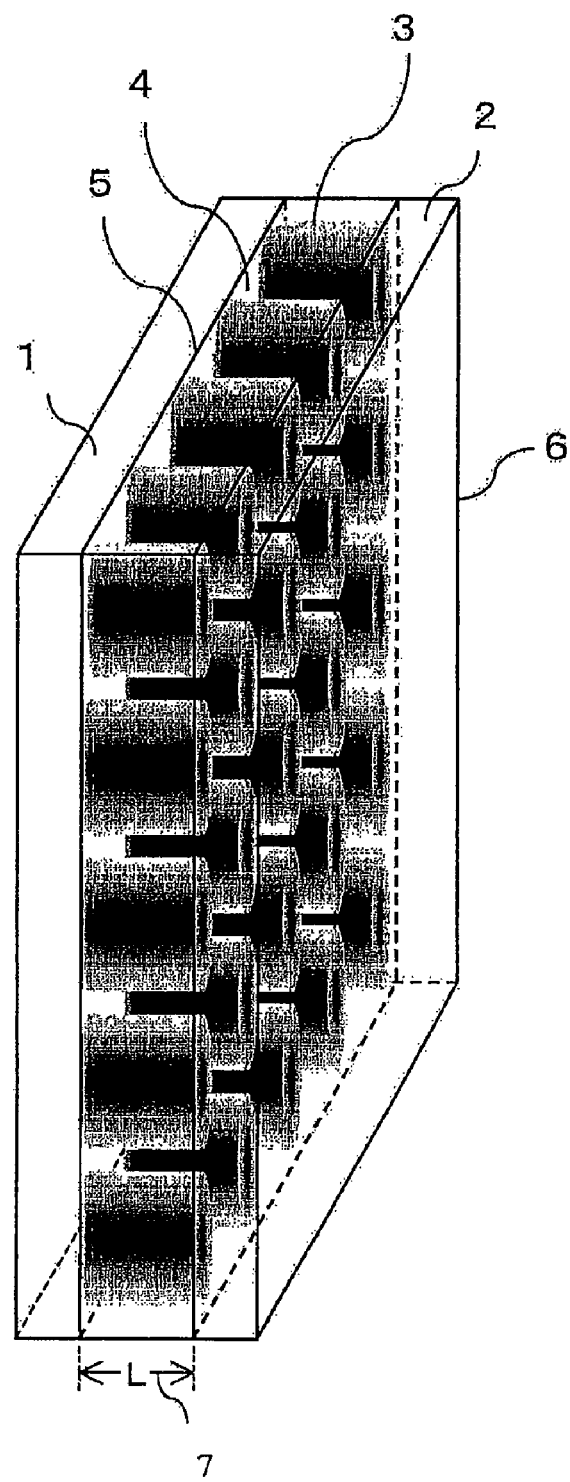
FIG. 14 shows an outline of a concentric circular distributed refractive index lens array in a direction perpendicular to a plane according to Embodiment 4 of the present invention.

FIG. 14 shows an outline of a distributed refractive index lens array of Embodiment 4 of the present invention.

The distributed refractive index lens array 6 of Embodiment 4 includes two transparent substrates (a first transparent substrate 1 and a second transparent substrate 2), and sheet-like polysilane 5 between the two transparent substrates. The sheet-like polysilane 5 has a uniform thickness, and thus the first transparent substrate 1 and the second transparent substrate 2 are parallel.

As shown in FIG. 14, the sheet-like polysilane 5 includes a plurality of concentric circular distributed refractive index lens parts 3 two-dimensionally periodically arranged in a direction parallel to a plane, and a clad part 4 other than the plurality of concentric circular distributed refractive index lens parts 3.

The concentric circular distributed refractive index lens part 3 has concentric circular refractive index distribution in which a refractive index is constant in a thickness direction of the sheet-like polysilane 5, a maximum part of the refractive index is dotted in the direction parallel to the plane, and the refractive index decreases substantially in a parabola according to a distance from the maximum part.

The concentric circular refractive index distribution of the embodiment is an example of "refractive index distribution" of the present invention. The part with the concentric circular refractive index distribution is "an area including a maximum part" of the present invention. The refractive index distribution that decreases substantially in a parabola according to a distance from the maximum part is an example of "distribution including a change of a refractive index decreasing with distance from a maximum part" of the present invention.

In FIG. 14, for the density showing the refractive index distribution of the concentric circular distributed refractive index lens part 3, the high density shows the high refractive index and the low density shows the low refractive index.

In the distributed refractive index lens of the present invention, as an example of the distribution including the change of the refractive index decreasing with distance from the maximum part, the refractive index distribution has been mainly described in which the maximum part is dotted, and the refractive index decreases substantially in a parabola according to the distance from the maximum part. However, not limited to this, for example, refractive index distribution may be such that a maximum part is not dotted but occupies a certain area, and a refractive index is fixed within the area and decreases substantially in a parabola with distance from the maximum part outside the area.

The thickness of the sheet-like polysilane 5 (specifically, equal to an interval between the two transparent substrates) is a lens length 7, and the lens length 7 is a distance L for an optical system formed to include the concentric circular distributed refractive index lens part 3 to form an image on an end surface of the concentric circular distributed refractive index lens part 3. The distance L is an example of a predetermined interval of the present invention.

Figure 15:
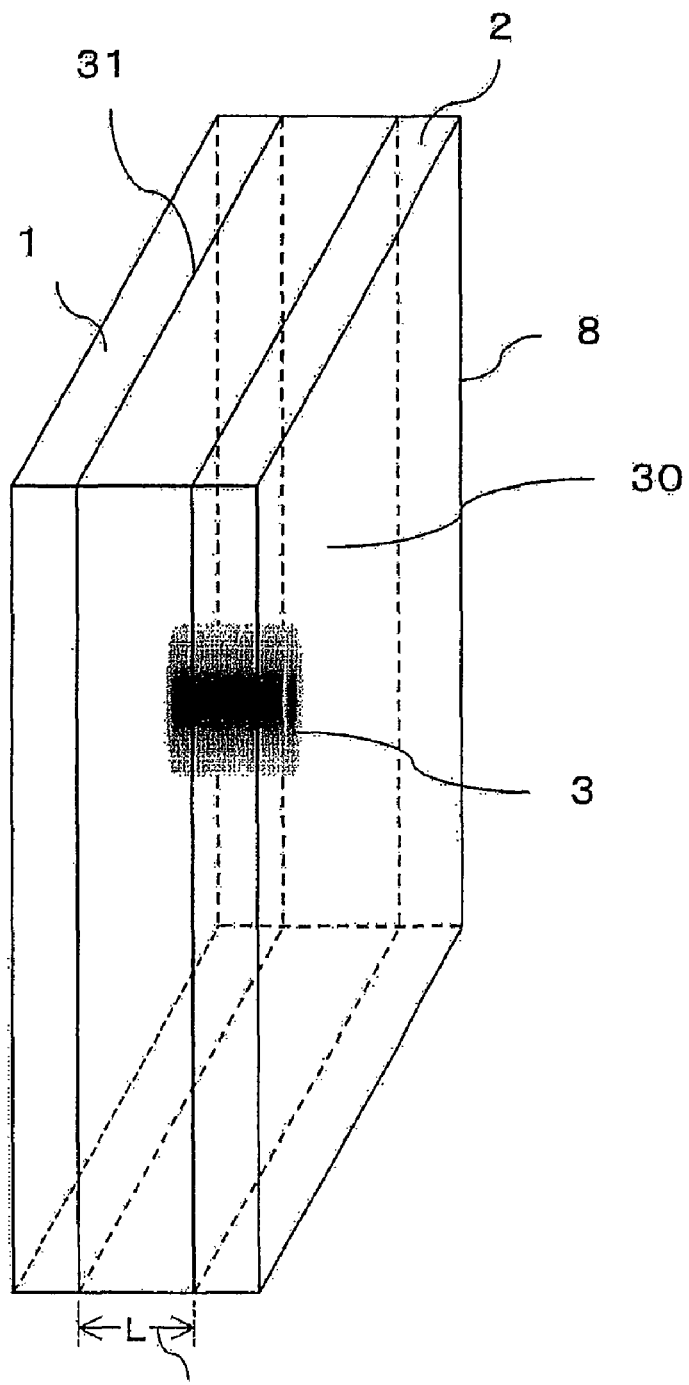
FIG. 15 shows an outline of a concentric circular distributed refractive index lens in a direction perpendicular to a plane according to Embodiment 4 of the present invention.

FIG. 15 shows an outline of a distributed refractive index lens 8 that is a distributed refractive index lens array 6 in FIG. 14 having a single concentric circular distributed refractive index lens part 3. The same components as in FIG. 14 are denoted by the same reference numerals. Both the distributed refractive index lens 8 and the distributed refractive index lens array 6 are examples of the distributed refractive index lens of the present invention.

A fabrication method of the distributed refractive index lens array 6 in a direction perpendicular to the plane of Embodiment 4 in FIG. 14 is an application of a fabrication method of the distributed refractive index lens 8 in the direction perpendicular to the plane in FIG. 15, and thus first, the fabrication method of the distributed refractive index lens 8 in FIG. 15 will be described.

As shown in FIG. 15, the distributed refractive index lens 8 includes two transparent substrates (a first transparent substrate 1 and a second transparent substrate 2), and sheet-like polysilane 31 between the two transparent substrates. The sheet-like polysilane 31 has a uniform thickness, and thus the first transparent substrate 1 and the second transparent substrate 2 are parallel.

The sheet-like polysilane 31 includes one concentric circular distributed refractive index lens part 3, and a clad part 30 other than the concentric circular distributed refractive index lens part 3.

The concentric circular distributed refractive index lens part 3 has concentric circular refractive index distribution in which a refractive index is constant in a thickness direction of the sheet-like polysilane 31, a maximum part of the refractive index is dotted in a direction parallel to the plane, and the refractive index decreases substantially in a parabola according to a distance form the maximum part.

The thickness of the sheet-like polysilane 31 (equal to an interval between the two transparent substrates) is a lens length 7, and the lens length 7 is a distance L for an optical system formed to include the concentric circular distributed refractive index lens part 3 to form an image on an end surface of the concentric circular distributed refractive index lens part 3.

Figure 16:
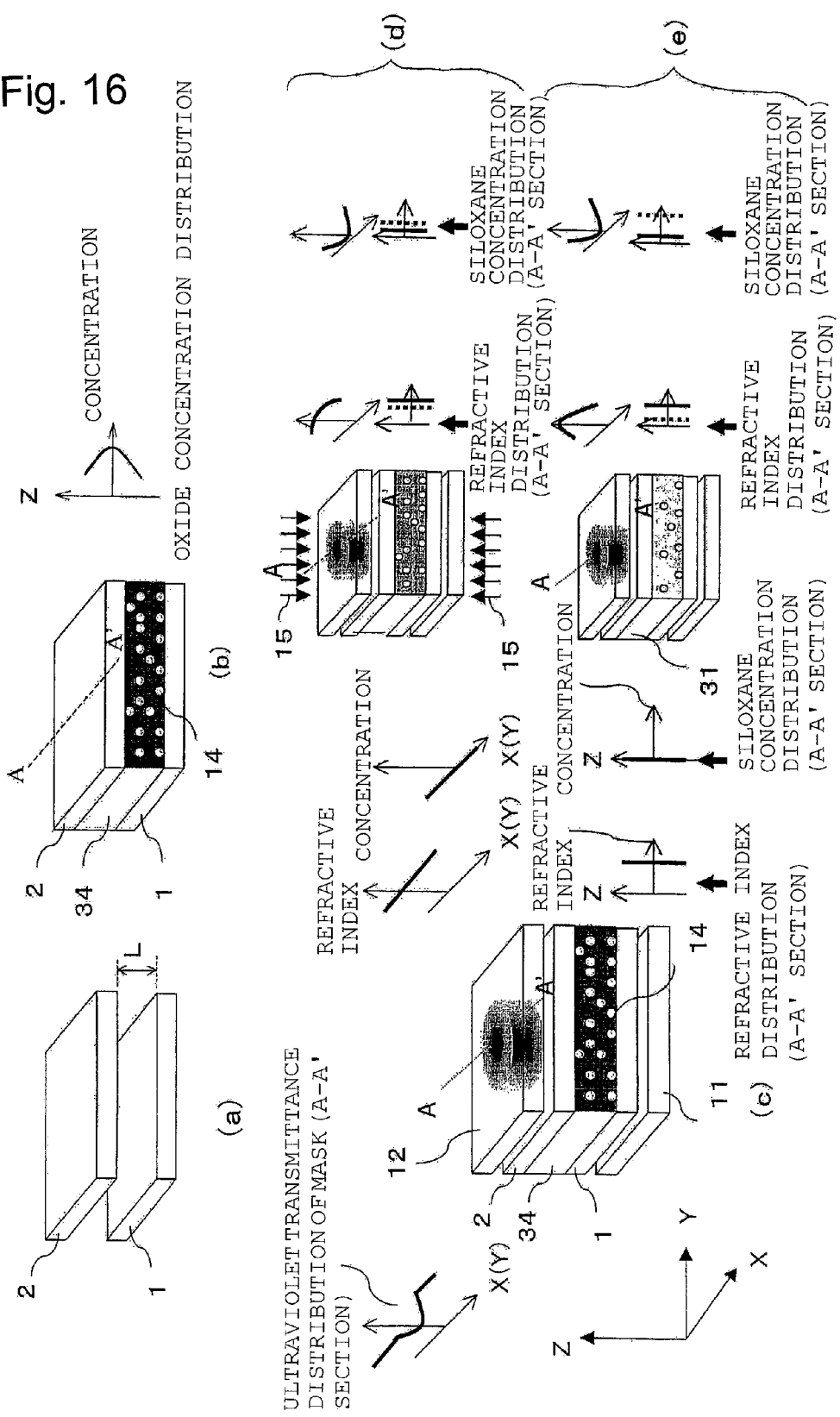
FIG. 16(a) shows a transparent substrate placing step in a fabrication step of the concentric circular distributed refractive index lens according to Embodiment 4 under oxygen atmosphere environment.
FIG. 16(b) shows a polysilane filling step in the fabrication step of the concentric circular distributed refractive index lens according to Embodiment 4 under oxygen atmosphere environment.
FIG. 16(c) shows a mask plate placing step in the fabrication step of the concentric circular distributed refractive index lens according to Embodiment 4 under oxygen atmosphere environment.
FIG. 16(d) shows an ultraviolet irradiation step in the fabrication step of the concentric circular distributed refractive index lens according to Embodiment 4 under oxygen atmosphere environment.
FIG. 16(e) shows the concentric circular distributed refractive index lens completed in the fabrication step of the concentric circular distributed refractive index lens according to Embodiment 4 under oxygen atmosphere environment.

FIG. 16 shows a fabrication step of the distributed refractive index lens 8 in the direction perpendicular to the plane in FIG. 15.

FIG. 16(a) shows a transparent substrate placing step, FIG. 16(b) shows a polysilane filling step, FIG. 16(c) shows a mask plate placing step, FIG. 16(d) shows an ultraviolet irradiation step, and FIG. 16(e) shows a completed distributed refractive index lens.

First, as shown in FIG. 16(a) the first transparent substrate 1 and the second transparent substrate 2 are placed in parallel with a predetermined interval L therebetween.

Polysilane (uncured) 34 is prepared to which an oxide 14 or peroxide formed by elements (ions) having ionicity with oxygen higher than ionicity between $Si(Si^{4+})$ and oxygen is added (see FIG. 16(b)).

As shown in FIG. 16(b), the polysilane (uncured) 34 to which the oxide 14 is added is filled between the first transparent substrate 1 and the second transparent substrate 2. Concentration distribution of the oxide 14 as an additive on the A-A' section in the polysilane 34 is shown by a graph with the axis of ordinate showing the thickness direction (the point of origin is the central position of the thickness) and the axis of abscissa showing the concentration. FIG. 16(b) shows symmetric distribution in which the oxide concentration is the highest at the central part of the polysilane (uncured) 34 and decreases toward the surface. The polysilane filling step is an example of a polysilane material filling step of the present invention.

Next, as shown in FIG. 16(c), an ultraviolet transmittance distribution first mask 11 and an ultraviolet transmittance distribution second mask 12 are placed outside the first transparent substrate 1 and the second transparent substrate 2 in parallel with the first transparent substrate 1 and the second transparent substrate 2. The ultraviolet transmittance distribution first mask 11 and the ultraviolet transmittance distribution second mask 12 both have ultraviolet transmittance distribution that counters a change in the refractive index distribution of the distributed refractive index lens 8 in a part facing the distributed refractive index lens 8 to be fabricated.

The graph shown on the left of the ultraviolet transmittance distribution second mask 12 in FIG. 16(c) shows ultraviolet transmittance distribution on the A-A' sections of the ultraviolet transmittance distribution first mask 11 and the second mask 12. The A-A' sections are parallel to a plane determined by x and z-axes among x, y and z-axes in FIG. 16(c), and include a minimum part of the ultraviolet transmittance of the masks 11 and 12.

Thus, the ultraviolet transmittance distribution second mask 12 has ultraviolet transmittance distribution in which ultraviolet transmittance becomes minimum in a part facing the maximum part of the refractive index of the distributed refractive index lens 8 to be fabricated, and increases substantially along a parabola symmetric with respect to the center according to a distance from the minimum part. The ultraviolet transmittance distribution first mask 11 also has the same ultraviolet transmittance distribution.

For the density on the central part of the ultraviolet transmittance distribution second mask 12, the high density at the central part shows low transmittance (being hard to transmit ultraviolet rays), and the low density around the central part shows high transmittance (sufficiently transmitting ultraviolet rays).

Then, as shown in FIG. 16(d), uniform ultraviolet rays 15 are applied from opposite sides of the sheet-like polysilane (uncured) 34 through the ultraviolet transmittance distribution first mask 11 and the ultraviolet transmittance distribution second mask 12 while heating. The polysilane (uncured)

34 is formed with refractive index distribution caused by creation of the siloxane structure by ultraviolet irradiation as being cured, and becomes polysilane (cured) 31 as shown in FIG. 16(e) to complete a distributed refractive index lens.

The polysilane (uncured) 34 and the polysilane (cured) 31 are examples of polysilane materials of the present invention.

The first transparent substrate 1 and the second transparent substrate may be transparent to at least ultraviolet rays and a wavelength used (a visible light for image pickup and reproduction), and an environment of each step may be an oxygen atmosphere.

The thickness of the sheet-like polysilane is determined to form a desired optical system so that focus positions are aligned with end surfaces of the two parallel transparent substrates or the like.

Next, a forming mechanism of the distributed refractive index lens in the direction perpendicular to the plane will be described with reference to FIGS. 4 and 17.

FIG. 4 shows a change in an internal structure by oxidation of polysilane resin as described in Embodiment 1. FIG. 17 illustrates refractive index distribution formed on the sheet-like polysilane by oxidation.

In the uncured sheet-like polysilane, the polysilane structure 9 with a high refractive index changes to a siloxane structure 10 with a low refractive index by an oxidation reaction during curing caused by ultraviolet exposure or heat treatment.

Figure 17:
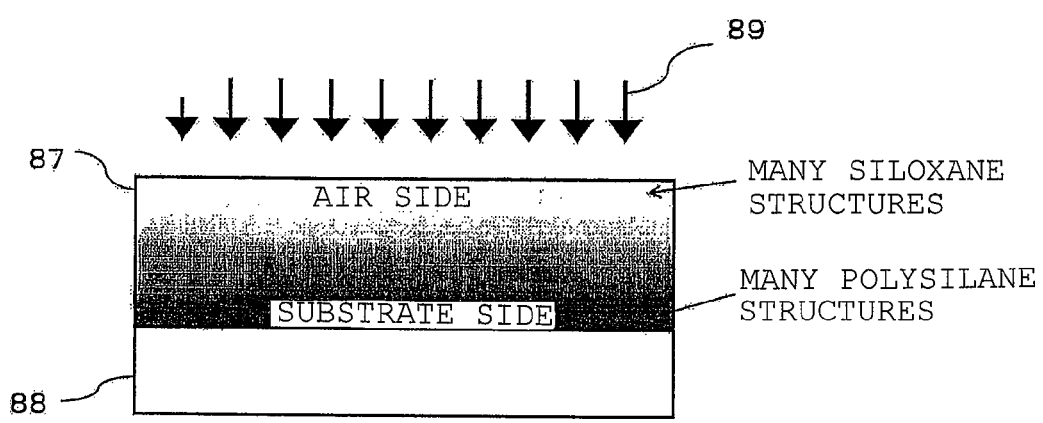
FIG. 17 illustrates refractive index distribution formed on the sheet-like polysilane by oxidation in Embodiment 4.

Thus, for oxygen atmosphere, as show in FIG. 17, ultraviolet irradiation 89 from above uncured sheet-like polysilane 87 applied on a transparent substrate 88 causes an oxidation reaction inwardly from the surface subjected to the ultraviolet irradiation 89 to create the siloxane structure 10 and consume oxygen, and thus the oxygen concentration decreases with distance from an ultraviolet light source.

Thus, the siloxane structure 10 with the low refractive index decreases with distance from the ultraviolet light source in proportional to the oxygen concentration.

Thus, the polysilane structure 9 part and the siloxane structure 10 part created by oxidation are distributed correspondingly to the oxidation reaction, and thus the refractive index distribution can be freely formed by the ultraviolet irradiation method and oxygen distribution.

When the thickness of the sheet-like polysilane 87 is small, 50 μm or less, the oxidation reaction can be performed with oxygen in the atmosphere, while when the thickness of the sheet-like polysilane 87 is large, 100 μm or more, or the sheet-like polysilane 87 is prevented from being directly exposed to air by a substrate or the like, oxygen in the atmosphere do not reach inside, and thus the oxidation reaction occurs only near the surface exposed to oxygen, and the part near the surface becomes a low refractive index part.

For example, like the distributed refractive index lens 8 in the direction perpendicular to the plane in FIG. 15, when refractive index distribution is formed in which the refractive index is constant in the thickness direction, and concentrically decreases substantially along a parabola according to a distance from a maximum point in the direction parallel to the plane, oxygen on the surface causes refractive index distribution in the thickness direction, and thus the sheet-like polysilane may be held between the two transparent substrates so that the surfaces are not exposed to oxygen (see FIG. 16). Then, an oxygen supply source is previously added to the sheet-like polysilane, and thus an oxidation reaction is caused by ultraviolet irradiation to form the refractive index distribution even if the polysilane is protected from outside oxygen by the two parallel transparent substrates.

Among four graphs on the right in FIGS. 16(c) to (e), upper two graphs show refractive index distribution and siloxane concentration distribution along the x-axis on the A-A' section of the polysilane (uncured) 34 and the polysilane (cured) 31 in each figure (corresponding to each step). The same distribution as the x-axis applies to the y-axis.

Thus, the refractive index distribution and the siloxane concentration distribution in the direction parallel to an ultraviolet irradiation surface of the polysilane (uncured) 34 change according to the ultraviolet irradiation 15. As described above, the A-A' section is parallel to the plane determined by the x and z-axes among the x, y and z-axes in FIG. 16(c), and includes a minimum part of the ultraviolet transmittance of the masks 11 and 12.

Among the four graphs on the right in FIGS. 16(c) to (e), lower two graphs show refractive index distribution and siloxane concentration distribution along the z-axis on the A-A' section of the polysilane (uncured) 34 and the polysilane (cured) 31 in each figure. Specifically, for each distribution, the distribution along the z-axis in a position corresponding to the minimum part of the ultraviolet transmittance of the masks 11 and 12 is shown by a solid line, and the distribution along the z-axis away from the minimum part is shown by a broken line.

More specifically, before the ultraviolet irradiation 15, the refractive index and the siloxane concentration are the same at the central part (the position corresponding to the minimum part of the ultraviolet transmittance of the masks 11 and 12) and the end (the position away from the minimum part) as shown in FIG. 16(c) (in FIG. 16(c), the solid line and the broken line are aligned), but the refractive index and the siloxane concentration change with development of the ultraviolet irradiation 15, and the amount of change is larger at the end than at the central part.

For the distributed refractive index lens in the direction perpendicular to the plane, the amount of oxidation reaction may have oxide distribution that counters desired refractive index distribution, and thus at least one of ultraviolet irradiation amount distribution and oxide distribution may be controlled. For a method for controlling the ultraviolet irradiation distribution, for example, masks can be used, the masks having ultraviolet transmittance distribution that counters the desired refractive index distribution outside the two parallel transparent substrates that hold the sheet-like polysilane. For distribution of an oxide, the oxide may be dispersed with distribution that counters the desired refractive index distribution.

When the amount of ultraviolet rays decreases in the thickness direction because of a large thickness of the sheet-like polysilane or the like, an oxide to be added to the sheet-like polysilane is distributed in the thickness direction in inversely proportional to the decreasing amount of ultraviolet rays. Naturally, the ultraviolet irradiation from opposite sides in the thickness direction takes shorter time for a process, and can reduce asymmetry of the ultraviolet intensity in the thickness direction by the decrease in the ultraviolet rays.

For the method for distributing the oxide in the thickness direction, for example, polysilanes with different amounts of oxide added may be filled or applied a plurality of times so as to form a plurality of layers in the polysilane filling step in FIG. 16(b).

A material transparent to ultraviolet rays, for example, glass such as quartz or borosilicate glass, ultraviolet transmissible resin, or a crystalline substrate such as $LiNbO_3$ or $LiTaO_3$ may be used as a material for the substrate.

An oxide or a peroxide added to the sheet-like polysilane is formed by elements (ions) having ionicity with oxygen higher than ionicity between $Si^{4+}$ and oxygen, such as $K^+$, $Na^+$, $Ca^{2+}$, $Mg^{2+}$, $Al^{3+}$, $Mn^{2+}$, $Fe^{2+}$, $Fe^{3+}$, and $Cu^{2+}$. When the peroxide is added to the sheet-like polysilane, the kind of ion contained in the peroxide added is not limited.

Figure 18:
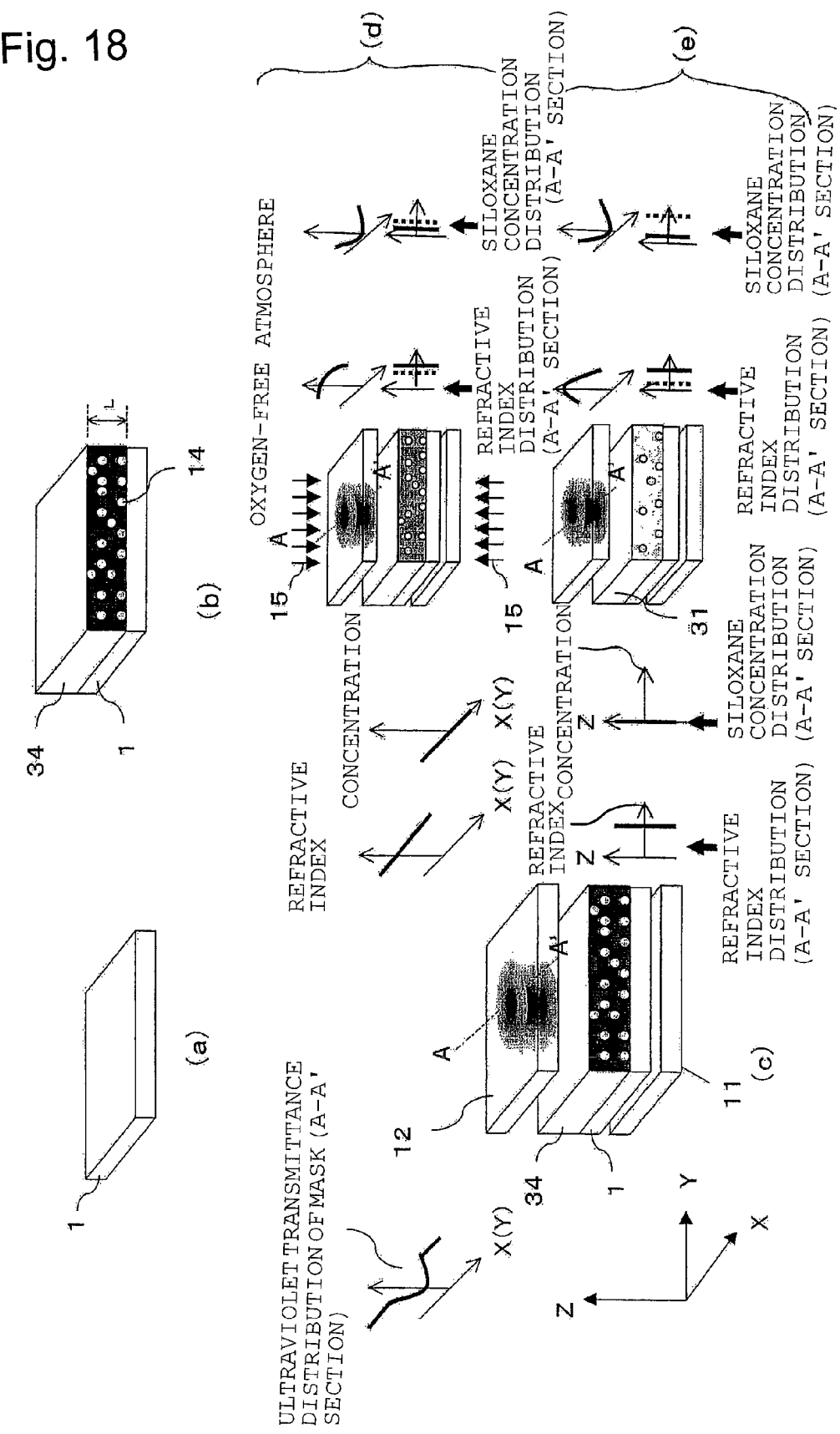
FIG. 18(a) shows a transparent substrate placing step in a fabrication step of the concentric circular distributed refractive index lens according to Embodiment 4 under oxygen-free atmosphere environment.
FIG. 18(b) shows a polysilane applying step in the fabrication step of the concentric circular distributed refractive index lens according to Embodiment 4 under oxygen-free atmosphere environment.
FIG. 18(c) shows a mask plate placing step in the fabrication step of the concentric circular distributed refractive index lens according to Embodiment 4 under oxygen-free atmosphere environment.
FIG. 18(d) shows an ultraviolet irradiation step in the fabrication step of the concentric circular distributed refractive index lens according to Embodiment 4 under oxygen-free atmosphere environment.
FIG. 18(e) shows the concentric circular distributed refractive index lens completed in the fabrication step of the concentric circular distributed refractive index lens according to Embodiment 4 under oxygen-free atmosphere environment.

FIG. 18 shows a fabrication step when the distributed refractive index lens 8 in the direction perpendicular to the plane in FIG. 15 is fabricated in an oxygen-free atmosphere. The same components as in FIG. 16 are denoted by the same reference numerals.

The case in FIG. 18 where the distributed refractive index lens 8 is fabricated in the oxygen-free atmosphere is different from the case in FIG. 16 where the lens is fabricated in the oxygen atmosphere in that a second transparent substrate 2 placed on polysilane (uncured) 34 is not used.

FIG. 18(a) shows a transparent substrate placing step, FIG. 18(b) shows a polysilane applying step, FIG. 18(c) shows a mask plate placing step, FIG. 18(d) shows an ultraviolet irradiation step, and FIG. 18(e) shows a completed distributed refractive index lens.

First, a first transparent substrate 1 is placed as shown in FIG. 18(a).

Polysilane (uncured) 34 is prepared to which an oxide 14 formed by elements (ions) having ionicity with oxygen higher than ionicity between Si ($Si^{4+}$) and oxygen is added (not shown).

Then, as shown in FIG. 18(b), the polysilane (uncured) 34 to which the oxide 14 is added is applied on the first transparent substrate 1 in a sheet shape so that the thickness thereof is a predetermined thickness L. The polysilane applying step is an example of a polysilane material applying step of the present invention.

Next, as shown in FIG. 18(c), an ultraviolet transmittance distribution first mask 11 is placed beneath the first transparent substrate 1, and an ultraviolet transmittance distribution second mask 12 is placed on an upper surface of the polysilane (uncured) 34 applied on the first transparent substrate 1. The ultraviolet transmittance distribution first mask 11 and the ultraviolet transmittance distribution second mask 12 are both the same mask plates as used in FIG. 16, and have ultraviolet transmittance distribution that counters a change in refractive index distribution of the distributed refractive index lens 8 in a part facing the distributed refractive index lens 8 to be fabricated.

Then, as shown in FIG. 18(d), uniform ultraviolet rays 15 are applied from opposite sides of the sheet-like polysilane (uncured) 34 through the ultraviolet transmittance distribution first mask 11 and the ultraviolet transmittance distribution second mask 12 while heating. The polysilane (uncured) 34 is formed with refractive index distribution as being cured, and becomes polysilane (cured) 31 as shown in FIG. 18(e) to complete a distributed refractive index lens.

Thus, when the process is performed in the oxygen-free atmosphere, there is no need for holding the sheet-like polysilane between two transparent substrates, and the first transparent substrate 1 only that holds the sheet-like polysilane may be provided.

However, in order to control the length of the distributed refractive index lens that determines an optical system of the distributed refractive index lens, the sheet-like polysilane may be held between two parallel transparent substrates even in the oxygen-free atmosphere.

Further, for ultraviolet irradiation in zero gravity, the substrate (the first transparent substrate 1) that holds the sheet-like polysilane is also unnecessary.

The distributed refractive index lens array 6 in the direction perpendicular to the plane of Embodiment 4 in FIG. 14 may be fabricated by applying the fabrication method of the distributed refractive index lens 8 described with reference to FIGS. 16 and 18.

In the fabrication method of the distributed refractive index lens 8 in the direction perpendicular to the plane described with reference to FIGS. 16 and 18, at least one of ultraviolet irradiation amount distribution and oxide distribution may be formed so as to counter the refractive index distribution of the distributed refractive index lens array 6 in the direction perpendicular to the plane.

Figure 19:
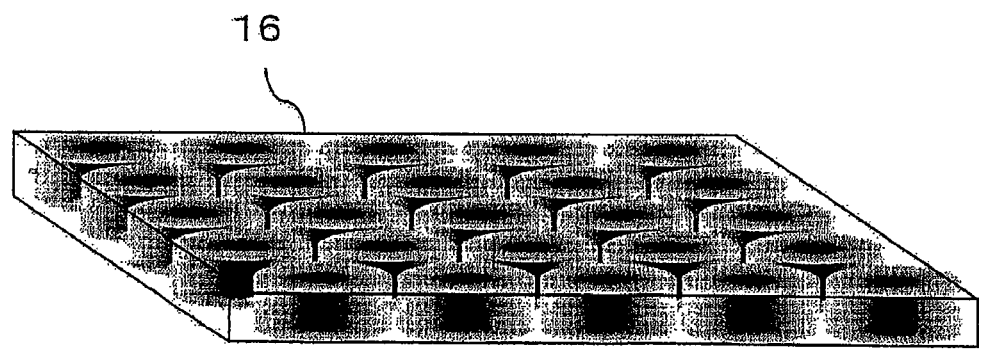
FIG. 19 shows an outline of a concentric circular distributed refractive index lens array mask according to Embodiment 4.

For example, in the fabrication method shown in FIGS. 16 and 18, a concentric circular lens array ultraviolet transmittance distribution mask 16 as shown in FIG. 19 may be used instead of the ultraviolet transmittance distribution first mask 11 and the ultraviolet transmittance distribution second mask 12.

FIG. 19 shows an outline of a mask plate used for fabricating the distributed refractive index lens array in the direction perpendicular to the plane. For the density in the concentric circular lens array ultraviolet transmittance distribution mask 16 in FIG. 19, the high density shows low transmittance (being hard to transmit ultraviolet rays), and the low density shows high transmittance (sufficiently transmitting ultraviolet rays).

In the concentric circular lens array ultraviolet transmittance distribution mask 16, as shown in FIG. 19, substantially concentric circular ultraviolet transmittance distributions in which the ultraviolet transmittance increases substantially in a parabola according to a distance from a minimum point are two-dimensionally periodically arranged in a direction parallel to the plane of the mask 16.

Figure 20:
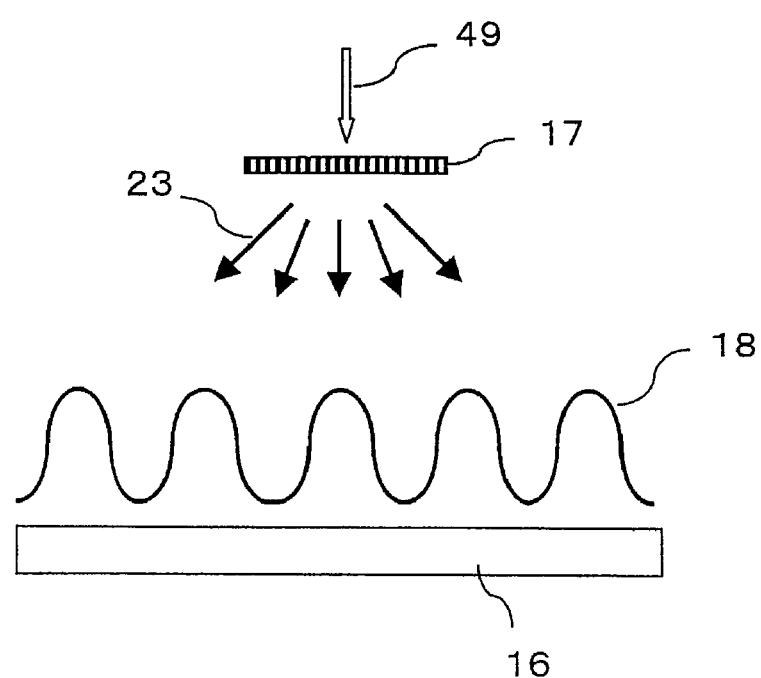
FIG. 20 shows an outline of a fabrication method of the concentric circular distributed refractive index lens array mask according to Embodiment 4.

FIG. 20 shows an outline of a method for forming the ultraviolet transmittance distribution as shown in FIG. 19 on the concentric circular lens array ultraviolet transmittance distribution mask 16.

In FIG. 20, diffracted lights 23 of electromagnetic waves such as a laser 49 are applied to a surface of the concentric circular lens array ultraviolet transmittance distribution mask 16 through a diffraction grating 17. Interference waves of the diffracted lights 23 cause standing waves 18 to be formed on the surface of the concentric circular lens array ultraviolet transmittance distribution mask 16. Thus, according to the intensity of the interference waves distributed like Gaussian distribution, the concentric circular lens array ultraviolet transmittance distribution mask 16 substrate is physically machined.

There is also a method for physically machining a mask surface with a die.

If the distribution is symmetric with respect to the center, the distribution becomes approximately parabolic, and thus Gaussian distribution also becomes approximately parabolic.

When the distributed refractive index lens array 6 in FIG. 14 is used for IP, an interval between the concentric circular distributed refractive index lens parts 3 corresponds to a resolution, and thus the concentric circular distributed refractive index lens parts 3 are desirably distributed with high density in the direction parallel to the plane of the sheet-like polysilane.

Figure 21:
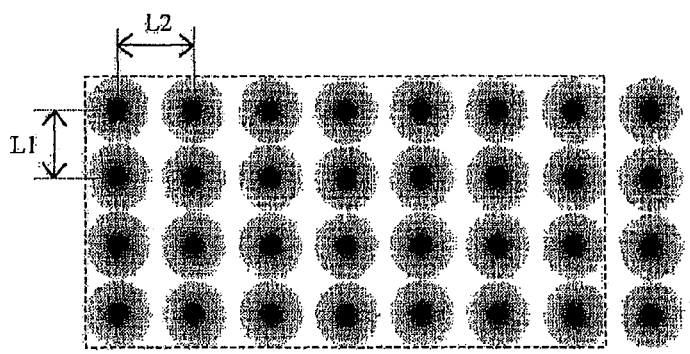
FIG. 21(a) shows concentric circular refractive index distribution being arranged in a rectangular grating.
FIG. 21(b) shows the concentric circular refractive index distribution being arranged in a triangular grating.
FIG. 21(c) shows the concentric circular refractive index distribution being a square grating.
Figure 21:
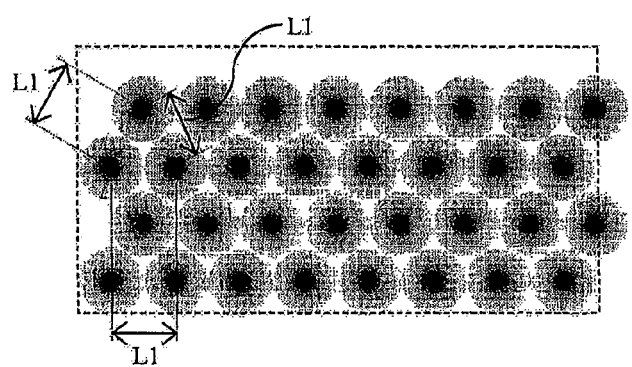
Figure 21:
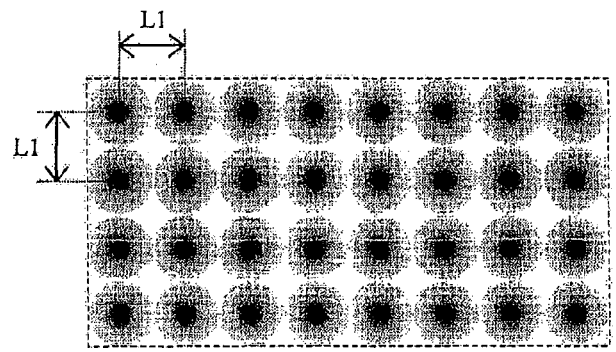

FIG. 21 shows an example in which the plurality of concentric circular distributed refractive index lens parts 3 are periodically arranged in the direction parallel to the plane.

FIG. 21(a) shows an example in which the concentric circular distributed refractive index lens parts 3 are arranged in a rectangular grating, FIG. 21(b) shows an example in which the concentric circular distributed refractive index lens parts 3 are arranged in a triangular grating, and FIG. 21(c) shows an example in which the concentric circular distributed refractive index lens parts 3 are arranged in a square grating. All the figures show the lens parts seen from the direction perpendicular to the plane of the sheet-like polysilane. For the density in each figure, the high density shows a high refractive index, and the low density shows a low refractive index.

L1 denotes a distance between maximum parts of the refractive index of adjacent concentric circular distributed refractive index lens parts 3 placed the closest to each other. The distance between the maximum parts of the refractive index of the adjacent concentric circular distributed refractive index lens parts 3 when arranged in the rectangular grating in FIG. 21(a) is vertically L1 and laterally L2. L1 is smaller than L2, and the distance L2 between the lateral maximum parts is longer than the distance L1 when the adjacent concentric circular distributed refractive index lens parts 3 are placed the closest to each other.

Rectangles shown by broken lines in FIGS. 21(a), (b) and (c) show a range occupied by concentric circular distributed refractive index lens parts 3 arranged in a square grating in FIG. 21(c) including vertically four lens parts and laterally 8 lens parts.

As shown in FIG. 21(a), the range occupied when 32 concentric circular distributed refractive index lens parts 3 are arranged in the rectangular grating is larger than the range occupied when the lens parts are arranged in the square grating.

In FIG. 21(b), the concentric circular distributed refractive index lens parts 3 are arranged in the triangular grating, and all the distances between the maximum parts of the adjacent concentric circular distributed refractive index lens parts 3 are L1. In this case, as shown in FIG. 21(b), the range occupied when 32 concentric circular distributed refractive index lens parts 3 are arranged is smaller than the range occupied when the lens parts are arranged in the square grating.

In FIG. 21(c) the concentric circular distributed refractive index lens parts 3 are arranged in the square grating, and all the distances between the maximum parts of vertically and laterally adjacent concentric circular distributed refractive index lens parts 3 are L1.

As described above, distribution with the highest density in the two-dimensional periodical structure is obtained when the concentric circular distributed refractive index lens parts are arranged in the triangular grating as shown in FIG. 21(b), and the arrangement in the triangular grating is the most preferable in view of resolution.

On the other hand, a display image needs to have symmetry. Specifically, the plurality of concentric circular distributed refractive index lens parts have to be placed to have the axis of rotational symmetry. Higher symmetry is preferable, and a larger number of fold axis of rotational symmetry provides higher symmetry. The axes of rotational symmetry in FIGS. 21(a), (b) and (c) are two, three, and four-folds, and the arrangement in the square grating in FIG. 21(c) is the most preferable in view of symmetry.

Thus, in view of both the resolution and the symmetry of the display image, distribution having three or more-fold axis of rotational symmetry such as a square grating or a triangular grating is preferable in a two-dimensional periodical structure.

Thus, in a state where polysilane to which an oxide is added is held between parallel transparent substrates by applying the fabrication method in FIG. 16 to prevent the supply of oxygen from the thickness direction, or in an oxygen-free atmosphere by applying the fabrication method in FIG. 18, ultraviolet rays are applied through masks having ultraviolet transmittance distribution corresponding to a desired distributed refractive index lens array pattern. This causes the added oxide to be reduced according to the intensity of the ultraviolet rays to create a siloxane structure with a lower refractive index than polysilane, and thus a plurality of distributed refractive index lenses in a direction perpendicular to a plane corresponding to a mask pattern can be simultaneously fabricated in a line in a direction parallel to the plane of the sheet-like polysilane in one process.

There is also a method for forming distribution of the amount of ultraviolet rays applied on sheet-like polysilane without using a mask having ultraviolet transmittance distribution.

Figure 22:
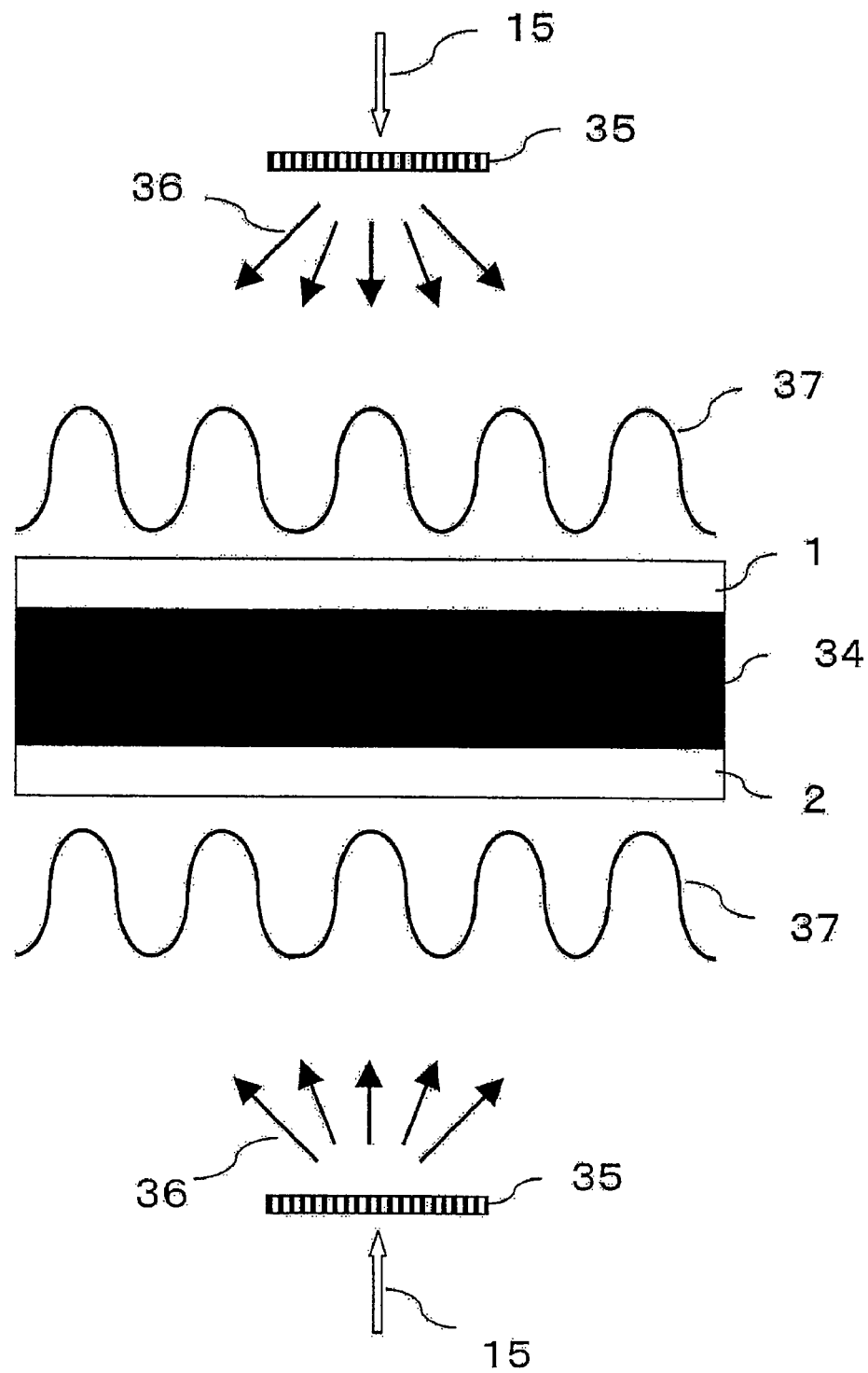
FIG. 22 shows an outline of an ultraviolet irradiation step using a diffraction grating in the fabrication step of the concentric circular distributed refractive index lens according to Embodiment 4 under oxygen atmosphere environment.

FIG. 22 shows an outline of a method for applying ultraviolet rays having intensity distribution without using a mask having ultraviolet transmittance distribution. In FIG. 22, ultraviolet irradiation is achieved having intensity distribution in a direction parallel to a plane of sheet-like polysilane using diffraction gratings 35.

Sheet-like polysilane 34, a first transparent substrate 1, and a second transparent substrate 2 in FIG. 22 are the same as those in FIG. 16. Ultraviolet rays 15 are applied to the sheet-like polysilane 34 using two diffraction gratings 35 instead of the ultraviolet transmittance distribution first mask 11 and the ultraviolet transmittance distribution second mask 12 in FIG. 16.

Diffracted lights 36 of the ultraviolet rays 15 are applied to opposite sides of the sheet-like polysilane 34 through the diffraction gratings 35. Interference waves of the diffracted lights 36 cause standing waves 37 to be applied to the opposite sides of the sheet-like polysilane 34. Specifically, the ultraviolet rays having the intensity distribution are applied to the opposite sides of the sheet-like polysilane 34.

Embodiment 5

Figure 23:
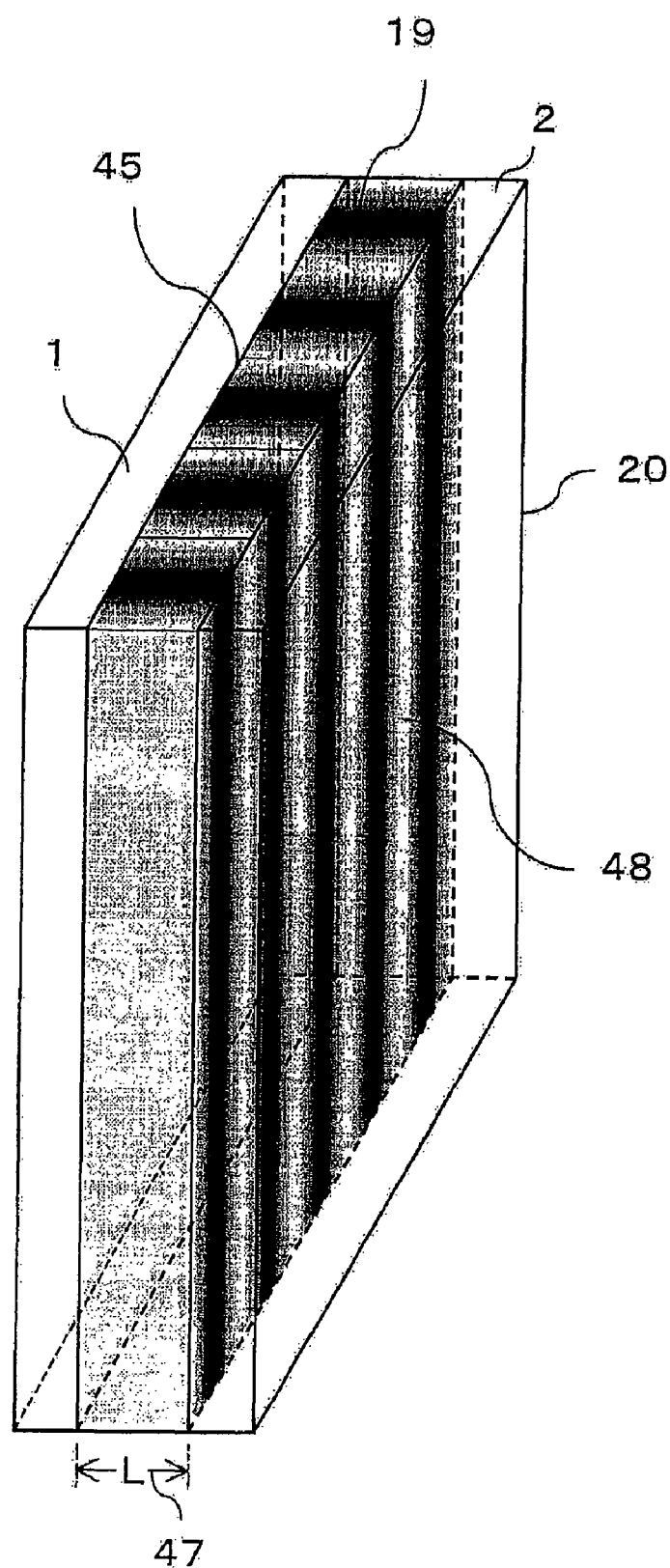
FIG. 23 shows an outline of a distributed refractive index bar lens array (a lenticular plate) in a direction perpendicular to a plane according to Embodiment 5 of the present invention.

FIG. 23 shows an outline of a distributed refractive index bar lens array of Embodiment 5 of the present invention. The same components as in FIG. 14 are denoted by the same reference numerals.

The distributed refractive index bar lens array (a lenticular plate) 20 of Embodiment 5 includes two transparent substrates (a first transparent substrate 1 and a second transparent substrate 2), and sheet-like polysilane 45 held between the two transparent substrates. The sheet-like polysilane 45 has a uniform thickness, and thus the first transparent substrate 1 and the second transparent substrate 2 are parallel.

As shown in FIG. 23, the sheet-like polysilane 45 includes a plurality of distributed refractive index bar lens parts 19 one-dimensionally periodically arranged in a direction parallel to a plane, and a clad part 48 other than the plurality of distributed refractive index bar lens parts 19.

The distributed refractive index bar lens part 19 has refractive index distribution in which a refractive index is constant in a thickness direction of the sheet-like polysilane 45, a maximum part of the refractive index is linear in the direction parallel to the plane, and the refractive index decreases substantially in a parabola according to a distance from the maximum part. In FIG. 23, for the density in the distributed refractive index bar lens part 19, the high density shows a high refractive index, and the low density shows a low refractive index.

The thickness of the sheet-like polysilane 45 (equal to an interval between the two transparent substrates) is a lens length 47, and the lens length 47 is a distance L for an optical system formed to include the distributed refractive index bar lens parts 19 to form an image on end surfaces of the distributed refractive index bar lens parts 19. The distance L is an example of a predetermined interval of the present invention.

Figure 24:
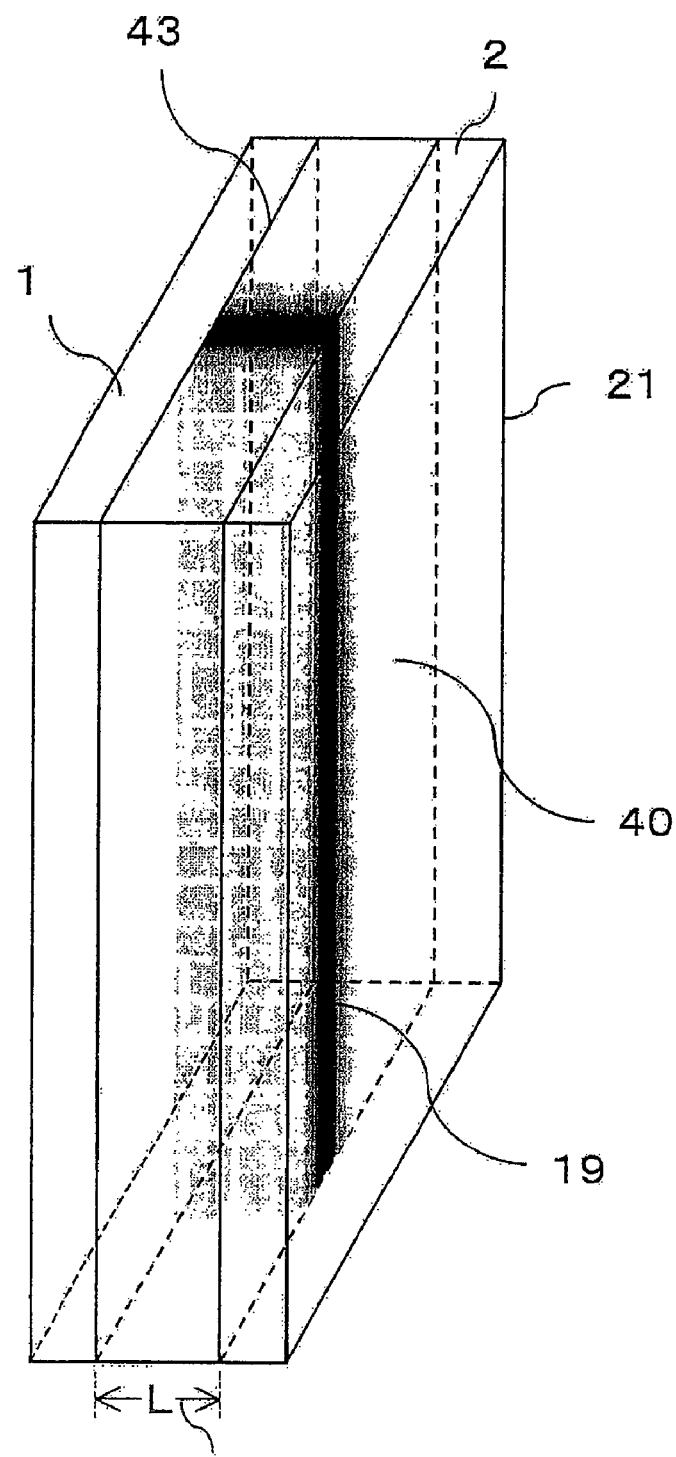
FIG. 24 shows an outline of a distributed refractive index bar lens in a direction perpendicular to a plane according to Embodiment 5.

FIG. 24 shows an outline of a distributed refractive index bar lens 21 that is a distributed refractive index bar lens array 20 in FIG. 23 having a single distributed refractive index bar lens part 19. The same components as in FIG. 23 are denoted by the same reference numerals. Both the distributed refractive index bar lens 21 and the distributed refractive index bar lens array 20 are examples of the distributed refractive index lens of the present invention.

A fabrication method of the distributed refractive index bar lens array (the lenticular plate) 20 in a direction perpendicular to the plane of Embodiment 5 in FIG. 23 is an application of a fabrication method of the distributed refractive index bar lens 21 in the direction perpendicular to the plane in FIG. 24, and thus first, the fabrication method of the distributed refractive index bar lens 21 in FIG. 24 will be described.

As shown in FIG. 24, the distributed refractive index bar lens 21 includes two transparent substrates (a first transparent substrate 1 and a second transparent substrate 2), and sheet-like polysilane 43 between the two transparent substrates. The sheet-like polysilane 43 has a uniform thickness, and thus the first transparent substrate 1 and the second transparent substrate 2 are parallel.

The sheet-like polysilane 43 includes one distributed refractive index bar lens part 19, and a clad part 40 other than the distributed refractive index bar lens part 19.

The distributed refractive index bar lens part 19 has refractive index distribution in which a refractive index is constant in a thickness direction of the sheet-like polysilane 43, a maximum part of the refractive index is linear in a direction parallel to the plane, and the refractive index decreases substantially in a parabola according to a distance from the maximum part.

The thickness of the sheet-like polysilane 43 (equal to an interval between the two transparent substrates) is a lens length 47, and the lens length 47 is a distance L for an optical system formed to include the distributed refractive index bar lens part 19 to form an image on an end surface of the distributed refractive index bar lens part 19.

Figure 25:
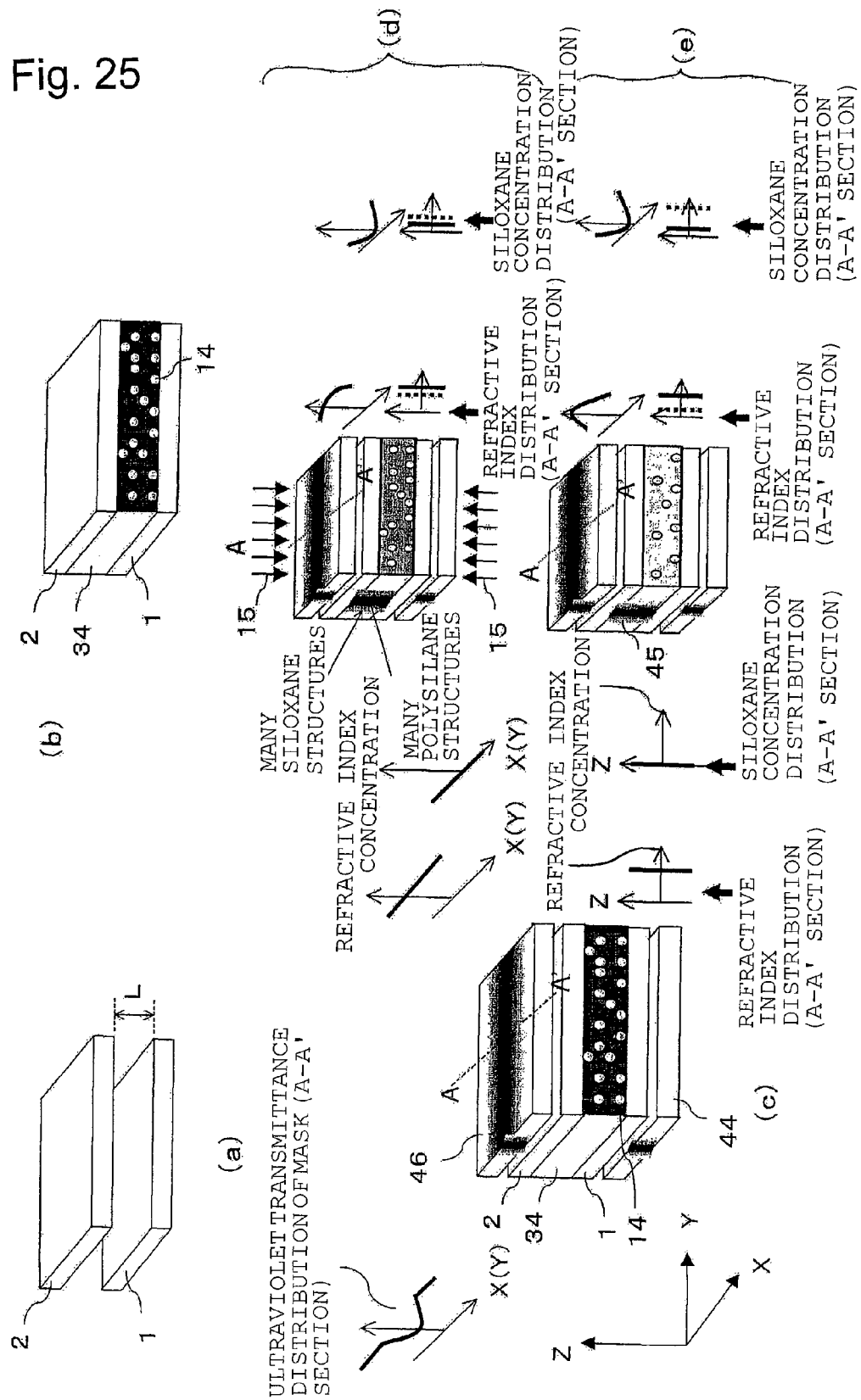
FIG. 25(a) shows a transparent substrate placing step in a fabrication step of the distributed refractive index bar lens according to Embodiment 5 under oxygen atmosphere environment.
FIG. 25(b) shows a polysilane filling step in the fabrication step of the distributed refractive index bar lens according to Embodiment 5 under oxygen atmosphere environment.
FIG. 25(c) shows a mask plate placing step in the fabrication step of the distributed refractive index bar lens according to Embodiment 5 under oxygen atmosphere environment.
FIG. 25(d) shows an ultraviolet irradiation step in the fabrication step of the distributed refractive index bar lens according to Embodiment 5 under oxygen atmosphere environment.
FIG. 25(e) shows the concentric circular distributed refractive index bar lens completed in the fabrication step of the distributed refractive index bar lens according to Embodiment 5 under oxygen atmosphere environment.

FIG. 25 shows a fabrication step of the distributed refractive index bar lens 21 in FIG. 24.

FIG. 25(a) shows a transparent substrate placing step, FIG. 25(b) shows a polysilane filling step, FIG. 25(c) shows a mask plate placing step, FIG. 25(d) shows an ultraviolet irradiation step, and FIG. 25(e) shows a completed distributed refractive index bar lens. This fabrication step is different from the step of fabricating the distributed refractive index lens 8 in FIG. 16 only in ultraviolet transmittance distribution formed on a mask plate used.

First, as shown in FIG. 25(a), the first transparent substrate 1 and the second transparent substrate 2 are placed in parallel with a predetermined interval L therebetween.

Polysilane (uncured) 34 is prepared to which an oxide 14 formed by elements having ionicity with oxygen higher than ionicity between Si and oxygen is added (not shown).

Then, as shown in FIG. 25(b), the polysilane (uncured) 34 to which the oxide 14 is added is filled between the first transparent substrate 1 and the second transparent substrate 2.

Then, as shown in FIG. 25(c), an ultraviolet transmittance distribution first mask 44 and an ultraviolet transmittance distribution second mask 46 are placed outside the first transparent substrate 1 and the second transparent substrate 2 in parallel with the first transparent substrate 1 and the second transparent substrate 2. The ultraviolet transmittance distribution first mask 44 and the ultraviolet transmittance distribution second mask 46 both have ultraviolet transmittance distribution that counters a change in the refractive index distribution of the distributed refractive index bar lens 21 in a part facing the distributed refractive index bar lens 21 to be fabricated.

The graph shown on the right of the ultraviolet transmittance distribution second mask 46 in FIG. 25(c) shows ultraviolet transmittance distribution on an A-A' section of the ultraviolet transmittance distribution second mask 46.

Thus, the ultraviolet transmittance distribution second mask 46 has ultraviolet transmittance distribution in which ultraviolet transmittance becomes minimum in a part facing the maximum part of the refractive index of the distributed refractive index bar lens 21 to be fabricated, and increases substantially along a parabola symmetric with respect to the center according to a distance from the minimum part. The ultraviolet transmittance distribution first mask 44 also has the same ultraviolet transmittance distribution.

For the density on the surface of the ultraviolet transmittance distribution second mask 46, the high density shows low transmittance (being hard to transmit ultraviolet rays), and the low density shows high transmittance (sufficiently transmitting ultraviolet rays). Specifically, the ultraviolet transmittance distribution of the ultraviolet transmittance distribution second mask 46 is formed in parallel lines as shown in FIGS. 25(c) to (e).

Then, as shown in FIG. 25(d), uniform ultraviolet rays 15 are applied from opposite sides of the sheet-like polysilane (uncured) 34 through the ultraviolet transmittance distribution first mask 44 and the ultraviolet transmittance distribution second mask 46 while heating. The polysilane (uncured) 34 is formed with refractive index distribution as being cured, and becomes polysilane (cured) 45 as shown in FIG. 25(e) to complete a distributed refractive index bar lens.

The first transparent substrate 1 and the second transparent substrate 2 may be transparent to at least ultraviolet rays and a wavelength used (a visible light for image pickup and reproduction), and an environment of the above described process may be an oxygen atmosphere.

The thickness of the sheet-like polysilane is determined to form a desired optical system so that focus positions are aligned with end surfaces of the two parallel transparent substrates or the like.

Thus, a forming mechanism of the distributed refractive index bar lens in the direction perpendicular to the plane is the same as the forming mechanism of the distributed refractive index lens in the direction perpendicular to the plane in FIG. 16 except that ultraviolet irradiation amount distribution in the direction parallel to the plane is one-dimensional.

Specifically, when the distributed refractive index bar lens is fabricated, the ultraviolet transmittance distribution of the mask may counter the refractive index distribution of the distributed refractive index bar lens in the direction perpendicular to the plane.

Figure 26:
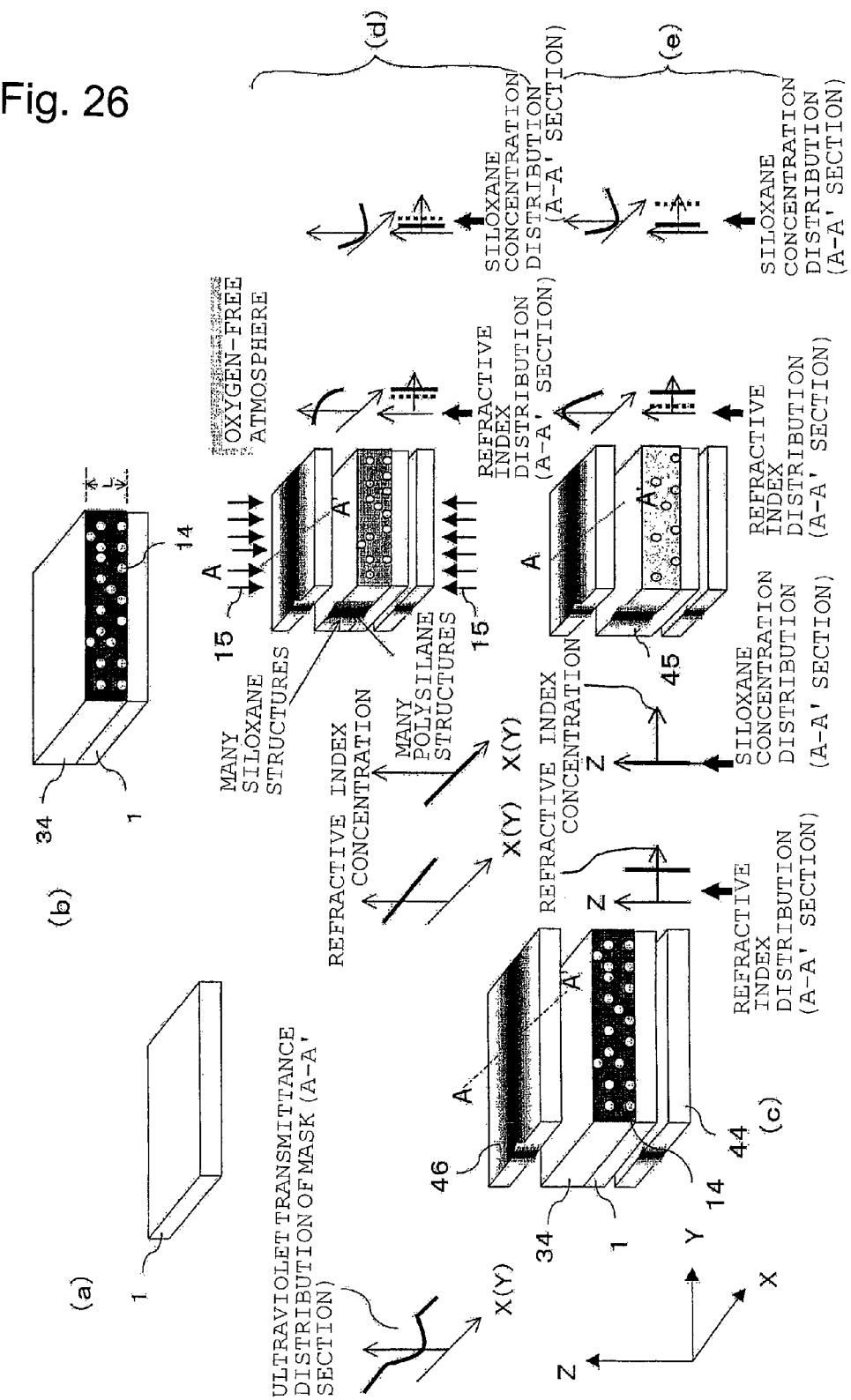
FIG. 26(a) shows a transparent substrate placing step in a fabrication step of the distributed refractive index bar lens according to Embodiment 5 under oxygen-free atmosphere environment.
FIG. 26(b) shows a polysilane applying step in the fabrication step of the distributed refractive index bar lens according to Embodiment 5 under oxygen-free atmosphere environment.
FIG. 26(c) shows a mask plate placing step in the fabrication step of the distributed refractive index bar lens according to Embodiment 5 under oxygen-free atmosphere environment.
FIG. 26(d) shows an ultraviolet irradiation step in the fabrication step of the distributed refractive index bar lens according to Embodiment 5 under oxygen-free atmosphere environment.
FIG. 26(e) shows the concentric circular distributed refractive index bar lens completed in the fabrication step of the distributed refractive index bar lens according to Embodiment 5 under oxygen-free atmosphere environment.

FIG. 26 shows a fabrication step when the distributed refractive index bar lens 21 in the direction perpendicular to the plane in FIG. 24 is fabricated in an oxygen-free atmosphere. The same components as in FIG. 25 are denoted by the same reference numerals.

The case in FIG. 26 where the distributed refractive index bar lens 21 is fabricated in the oxygen-free atmosphere is different from the case in FIG. 25 where the lens is fabricated in the oxygen atmosphere in that a second transparent substrate 2 placed on polysilane (uncured) 34 is not used.

FIG. 26(a) shows a transparent substrate placing step, FIG. 26(b) shows a polysilane applying step, FIG. 26(c) shows a mask plate placing step, FIG. 26(d) shows an ultraviolet irradiation step, and FIG. 26(e) shows a completed distributed refractive index bar lens.

First, a first transparent substrate 1 is placed as shown in FIG. 26(a).

Polysilane (uncured) 34 is prepared to which an oxide 14 formed by elements (ions) having ionicity with oxygen higher than ionicity between Si ($Si^{4+}$) and oxygen is added (not shown).

Then, as shown in FIG. 26(b), the polysilane (uncured) 34 to which the oxide 14 is added is applied on the first transparent substrate 1 in a sheet shape so that the thickness thereof is a predetermined thickness L.

Next, as shown in FIG. 26(c), an ultraviolet transmittance distribution first mask 44 is placed beneath the first transparent substrate 1, and an ultraviolet transmittance distribution second mask 46 is placed on an upper surface of the polysilane (uncured) 34 applied on the first transparent substrate 1. The ultraviolet transmittance distribution first mask 44 and the ultraviolet transmittance distribution second mask 46 are both the same mask plates as used in FIG. 25, and have ultraviolet transmittance distribution that counters a change in refractive index distribution of the distributed refractive index bar lens 21 in a part facing the distributed refractive index bar lens 21 to be fabricated.

Then, as shown in FIG. 26(d), uniform ultraviolet rays 15 are applied from opposite sides of the sheet-like polysilane (uncured) 34 through the ultraviolet transmittance distribution first mask 44 and the ultraviolet transmittance distribution second mask 46 while heating. The polysilane (uncured) 34 is formed with refractive index distribution as being cured, and becomes polysilane (cured) 45 as shown in FIG. 26(e) to complete a distributed refractive index bar lens.

Thus, when the process is performed in the oxygen-free atmosphere, there is no need for holding the sheet-like polysilane between two transparent substrates, and the first transparent substrate 1 only that holds the sheet-like polysilane may be provided. However, in order to control the length of the distributed refractive index bar lens that determines the optical system of the distributed refractive index bar lens, the sheet-like polysilane may be held between two parallel transparent substrates even in the oxygen-free atmosphere.

The distributed refractive index bar lens array (the lenticular plate) 20 in the direction perpendicular to the plane of Embodiment 5 in FIG. 23 may be fabricated by applying the fabrication method of the distributed refractive index bar lens 21 described with reference to FIGS. 25 and 26.

In the fabrication method of the distributed refractive index bar lens 21 in the direction perpendicular to the plane described with reference to FIGS. 25 and 26, at least one of ultraviolet irradiation amount distribution and oxide distribution may be formed so as to counter the refractive index distribution of the distributed refractive index bar lens array 20 in the direction perpendicular to the plane.

Figure 27:
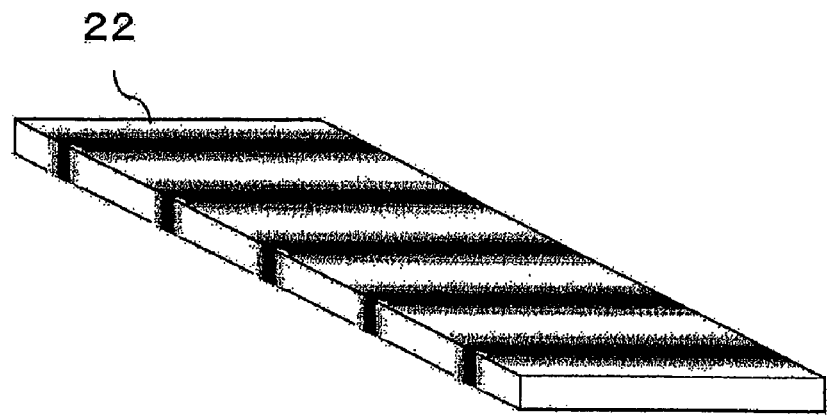
FIG. 27 shows an outline of a distributed refractive index bar lens array mask according to Embodiment 5.

For example, in the fabrication method shown in FIGS. 25 and 26, a bar lens array ultraviolet transmittance distribution mask 22 as shown in FIG. 27 may be used instead of the ultraviolet transmittance distribution first mask 44 and the ultraviolet transmittance distribution second mask 46.

FIG. 27 shows an outline of a mask plate used for fabricating the distributed refractive index bar lens array 20 in the direction perpendicular to the plane. For the density in the bar lens array ultraviolet transmittance distribution mask 22 in FIG. 27, the high density shows low transmittance (being hard to transmit ultraviolet rays), and the low density shows high transmittance (sufficiently transmitting ultraviolet rays).

In the bar lens array ultraviolet transmittance distribution mask 22, as shown in FIG. 27, ultraviolet transmittance distributions in which the ultraviolet transmittance distribution increases substantially in a parabola according to a distance from a linear minimum part are one-dimensionally periodically arranged in a direction parallel to the plane of the mask.

When the distributed refractive index bar lens array (the lenticular plate) 20 in FIG. 23 is used for IP, an interval between the distributed refractive index bar lens parts 19 corresponds to a resolution, and thus the distributed refractive index bar lens parts 19 are desirably distributed with high density in the direction parallel to the plane of the sheet-like polysilane. For symmetry of the distribution, the distributed refractive index bar lens array has a two-fold axis of rotational symmetry because of the one-dimensional period.

Thus, in a state where polysilane to which an oxide is added is held between parallel transparent substrates by applying the fabrication method in FIG. 25 to prevent the supply of oxygen from the thickness direction, or in an oxygen-free atmosphere by applying the fabrication method in FIG. 26, ultraviolet rays are applied through masks having ultraviolet transmittance distribution corresponding to a desired distributed refractive index bar lens array pattern. This causes the added oxide to be reduced according to the intensity of the ultraviolet rays to create a siloxane structure with a lower refractive index than polysilane, and thus a plurality of distributed refractive index bar lenses in a direction perpendicular to a plane corresponding to a mask pattern can be simultaneously fabricated in a line in a direction parallel to the plane of the sheet-like polysilane in one process.

Embodiment 6

Figure 28:
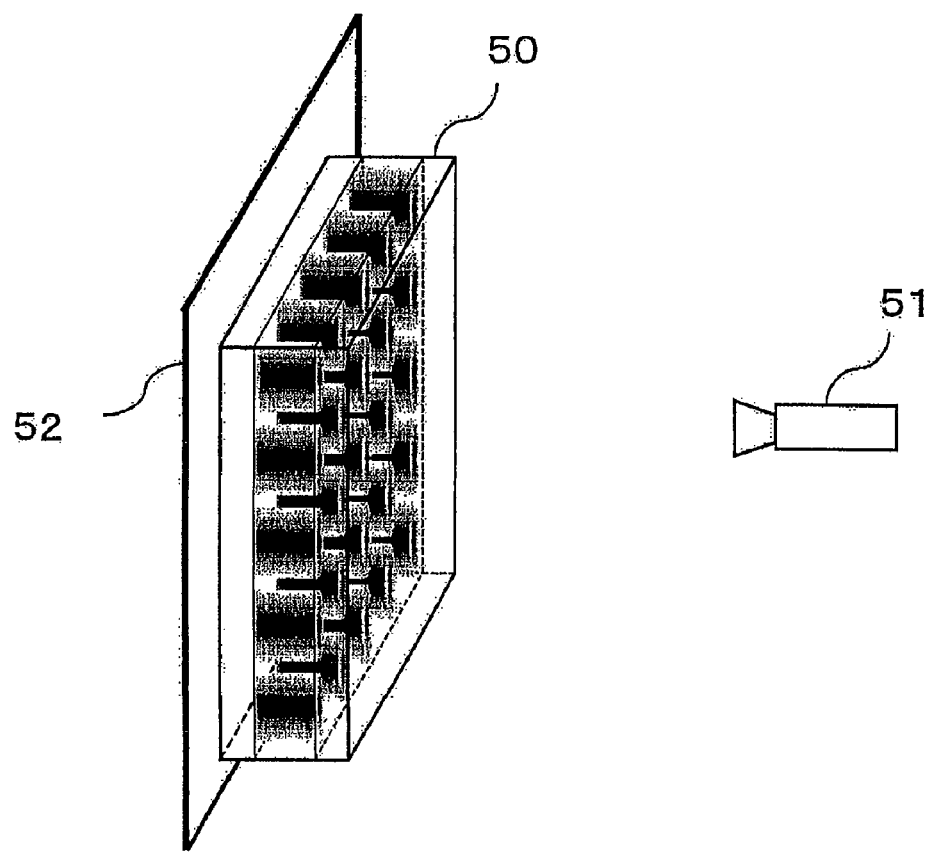
FIG. 28 shows an outline of a three-dimensional image pickup apparatus according to Embodiment 6 of the present invention.

FIG. 28 shows an outline of a three-dimensional image pickup apparatus in which a distributed refractive index lens of Embodiment 6 of the present invention is used for IP.

The three-dimensional image pickup apparatus of Embodiment 6 includes a distributed refractive index lens array 50 fabricated by the production method in Embodiment 4, and a television camera 51. For the distributed refractive index lens array 50, only 25 concentric circular refractive index distributions are shown in FIG. 28 for clarity of the refractive index distributions, but actually 10,000 or more concentric circular refractive index distributions are two-dimensionally periodically arranged.

The distributed refractive index lens array 50 is an example of a display panel of the present invention, and the television camera 51 is an example of a camera of the present invention.

When a photographic film 52 is placed behind the distributed refractive index lens array 50, the image is formed on an end surface of the distributed refractive index lens array 50 on the side of the television camera 51. The end surface of the distributed refractive index lens array 50 is photographed by the television camera 51 to photograph a three-dimensional image.

Figure 29:
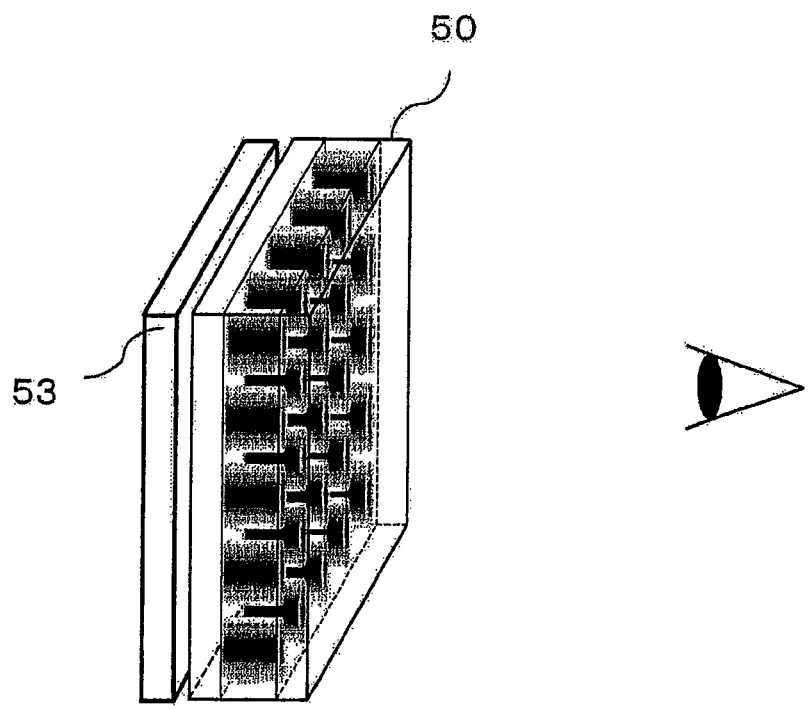
FIG. 29 shows an outline of a three-dimensional image reproduction apparatus according to Embodiment 6.
Figure 30:
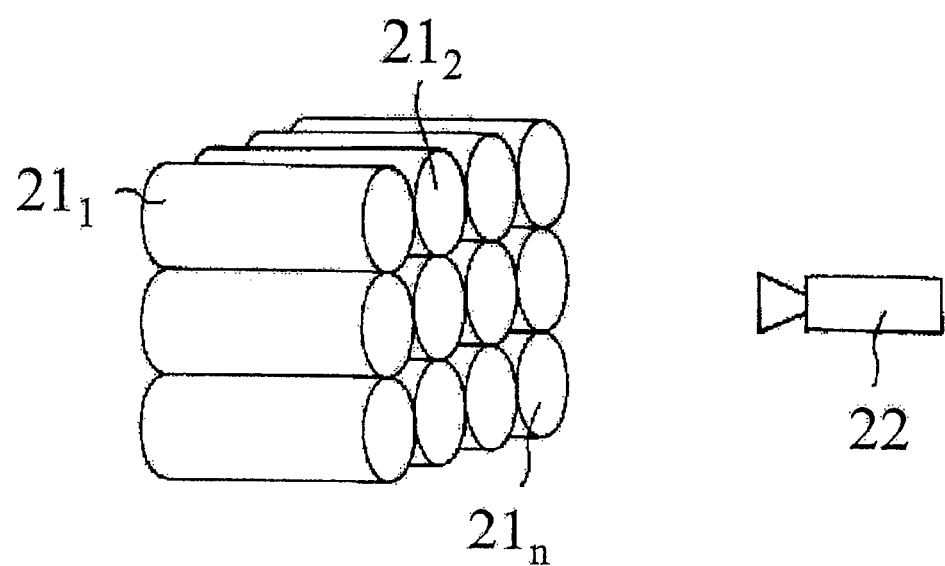
FIG. 30 shows a configuration of a conventional three-dimensional image pickup apparatus using optical fibers.

FIG. 29 shows an outline of a three-dimensional image reproduction apparatus in which the distributed refractive index lens of Embodiment 6 is used for IP.

The three-dimensional image reproduction apparatus of Embodiment 6 uses the same distributed refractive index lens array 50 as the three-dimensional image pickup apparatus in FIG. 28 for IP. A display device array 53 is placed on a back surface of the distributed refractive index lens array 50. In the display device array 53, a plurality of display devices are two-dimensionally periodically arranged to face a plurality of distributed refractive index lens parts included in the distributed refractive index lens array 50.

The display devices of the display device array 53 display images corresponding to the distributed refractive index lens parts included in the facing distributed refractive index lens array 50. The images are formed and displayed on end surfaces of the distributed refractive index lens arrays 50 opposite from the display device array 53. Then, a three-dimensional image can be viewed on the end surfaces of the distributed refractive index lens arrays 50.

It is understood that the descriptions on the three-dimensional image reproduction apparatus and the three-dimensional image pickup apparatus in Embodiment 1 can be applied to the apparatus in this embodiment. The descriptions on the three-dimensional image reproduction apparatus and the three-dimensional image pickup apparatus in Embodiment 2 can be applied to the case where the distributed refractive index bar lens array in Embodiment 5 is used for IP, and the descriptions thereof will be omitted.

Thus, the distributed refractive index lens of the present invention is used for IP, and a three-dimensional image fabrication apparatus and a three-dimensional image reproduction apparatus can be produced at low costs, thereby providing a three-dimensional image fabrication apparatus and a three-dimensional image reproduction apparatus that are inexpensive.

As described above, with the distributed refractive index lens and the production method thereof of the present invention, the plurality of distributed refractive index lenses in the direction perpendicular to the plane corresponding to the mask pattern can be simultaneously fabricated in a line in the direction parallel to the plane of the sheet-like polysilane in one process, using refractive index distribution during ultraviolet irradiation of polysilane. This provides an inexpensive distributed refractive index lens array panel used for IP.

The distributed refractive index lens of the present invention has heat resistance up to 250° C. because of the oxidation reaction of polysilane, and can be used as a projection lens of a projector for which a conventional distributed refractive index lens using photo polymerization material cannot be used because of low heat resistance.

As described in the embodiments, the distributed refractive index lens of the present invention includes a single lens such as the distributed refractive index lens 8 in FIG. 15 and the distributed refractive index bar lens 21 in FIG. 24, and also includes a lens array constituted by a plurality of distributed refractive index lenses such as the distributed refractive index lens array 6 in FIG. 14 and the distributed refractive index bar lens array 20 in FIG. 23.

As is apparent from the above description, this specification includes the following inventions.

The 1st aspect of the present invention is a distributed refractive index lens comprising a plurality of areas having refractive index distribution,
wherein said distributed refractive index lens is a substrate member containing polysilane,
said refractive index distribution of said areas is a distribution that includes a change in a refractive index in a direction parallel to a plane of said substrate member, and the distribution is substantially constant in the refractive index in a direction perpendicular to said plane of said substrate member.

The 2nd aspect of the present invention is the distributed refractive index lens according to the 1st aspect of the present invention, wherein said refractive index distribution on each of said plurality of areas has a maximum refractive index, at a first location, as a maximum part, and includes a change in said refractive index decreasing with distance from said first location in said area including said maximum refractive index.

The 3rd aspect of the present invention is the distributed refractive index lens according to the 2nd aspect of the present invention, wherein said refractive index distribution in the direction parallel to said plane in said area has a dotted maximum part, and said refractive index distribution includes a concentric circular distribution around said maximum refractive index in said area.

The 4th aspect of the present invention is the distributed refractive index lens according to the 3rd aspect of the present invention, wherein said plurality of maximum refractive indexes are periodically placed in the direction parallel to said plane.

The 5th aspect of the present invention is the distributed refractive index lens according to the 4th aspect of the present invention, wherein said plurality of maximum refractive indexes are placed to have an axis of rotational symmetry.

The 6th aspect of the present invention is the distributed refractive index lens according to the 2nd aspect of the present invention, wherein said refractive index distribution of each of said areas has a maximum refractive index substantially along a line, as a linear maximum part, and includes a change in said refractive index decreasing with distance from said line.

The 7th aspect of the present invention is the distributed refractive index lens according to the 6th aspect of the present invention, wherein said plurality of maximum parts are placed in parallel at regular intervals.

The 8th aspect of the present invention is the distributed refractive index lens according to the 2nd aspect of the present invention, wherein said substrate member is a member in which a plurality of laminating members having said plurality of areas with said refractive index distribution are laminated in a thickness direction,
said refractive index distribution of each respective area is a distribution around an axis, in which said refractive index substantially decreases with distance from said axis in a direction substantially perpendicular to said axis,
each of said axes for said plurality of areas is substantially parallel to a lamination surface of each of said laminating members, and said axes are substantially parallel to each other, and
one of opposite side surfaces of said laminating members perpendicular to said axes is an incident surface of light, and another one of the opposite side surfaces is an emission surface of said light.

The 9th aspect of the present invention is the distributed refractive index lens according to the 8th aspect of the present invention, wherein said refractive index distribution on each of said areas is a distribution in which said refractive index substantially decreases with distance from said respective axis in all directions in any plane substantially perpendicular to said respective axis.

The 10th aspect of the present invention is the distributed refractive index lens according to the 9th aspect of the present invention, wherein said plurality of areas are placed in a matrix in said substrate member, and opposite end portions of said areas are exposed in said opposite sides, and
said refractive index distribution and a distance between said opposite end portions of said areas are determined so that light from a subject entering each area from said incident surface form an image of said subject on a surface of each end portion exposed in said emission surface.

The 11th aspect of the present invention is the distributed refractive index lens according to the 2nd aspect of the present invention, wherein said substrate member is a member in which a plurality of laminating members having a plurality of areas with said refractive index distribution are laminated in a thickness direction,
said refractive index distribution of said areas is a distribution in which said refractive index substantially decreases from a center toward a lamination surface of said laminating member in said thickness direction of said laminating member, one of opposite side surfaces of said laminating members substantially parallel to said laminating direction is an incident surface of light, and another one of the opposite side surfaces is an emission surface of said light.

The 12th aspect of the present invention is the distributed refractive index lens according to the 11th aspect of the present invention, wherein said refractive index distribution and a distance between said opposite end portions are determined so that light from a subject entering said incident surface form an image of said subject on an end surface of each of said substrate member exposed in said emission surface.

The 13th aspect of the present invention is the distributed refractive index lens according to the 2nd aspect of the present invention, wherein said substrate member is a member in which siloxane structures are distributed in a base material containing polysilane as a main ingredient such that said refractive index distribution correlates with the distribution of the siloxane structures in the base material.

The 14th aspect of the present invention is a production method for producing a distributed refractive index lens including a plurality of areas having a refractive index distribution, comprising:

a polysilane material preparing step of preparing a substrate of polysilane material to which an oxide is added in a predetermined distribution; and an ultraviolet irradiation step of applying ultraviolet rays having an intensity distribution to said substrate of said polysilane material to form said refractive index distribution on said polysilane material, wherein said predetermined distribution of said oxide is a distribution in which a concentration of said oxide is lower at a part closer to an irradiation surface of said polysilane material to which said ultraviolet rays are applied.

The 15th aspect of the present invention is the production method according to the 14th aspect of the present invention, wherein said polysilane material preparing step includes a polysilane material applying step of applying said polysilane material on a transparent substrate, and in said ultraviolet irradiation step, the ultraviolet rays are applied from opposite sides: an upper surface of said polysilane material and a lower surface thereof through said transparent substrate.

The 16th aspect of the present invention is the production method according to the 14th aspect of the present invention, wherein said polysilane material preparing step includes a polysilane material filling step of filling said polysilane material between a plurality of transparent substrates placed in parallel with a predetermined distance therebetween, and in said ultraviolet irradiation step, the ultraviolet rays are applied from opposite sides of said polysilane material so as to be applied to said polysilane material through said plurality of transparent substrates.

The 17th aspect of the present invention is the production method according to the 14th aspect of the present invention, wherein said ultraviolet irradiation step includes:

placing a mask plate having an ultraviolet rays transmittance distribution in parallel with said polysilane material on one surface of said polysilane material, and applying the ultraviolet rays having a substantially uniform intensity through said mask plate so that said ultraviolet rays having an intensity distribution are applied to said polysilane material.

The 18th aspect of the present invention is the production method according to the 17th aspect of the present invention, wherein said ultraviolet irradiation step further includes:

placing another mask plate having a common ultraviolet rays transmittance distribution as said mask plate in parallel on an opposite side of said polysilane material, and applying the ultraviolet rays having the substantially uniform intensity from two directions outside said mask plate and said another mask plate so that the ultraviolet rays having said intensity distribution are applied to opposite sides of said polysilane material through said mask plate and said another mask plate.

The 19th aspect of the present invention is the production method according to the 14th aspect of the present invention, wherein said ultraviolet irradiation step includes applying the ultraviolet rays to said polysilane material through a diffraction grating so that ultraviolet ray having said intensity distribution are applied to said polysilane material.

The 20th aspect of the present invention is the production method according to the 14th aspect of the present invention, wherein said intensity distribution of said ultraviolet rays is a distribution in which an intensity of said ultraviolet rays applied to a part with a first refractive index is higher than an intensity of said ultraviolet rays applied to another part with a second refractive index to achieve said refractive index distribution, the first refractive index being lower than the second refractive index.

The 21st aspect of the present invention is the production method according to the 20th aspect of the present invention, wherein said distribution of said oxide is a distribution in which a concentration of said oxide becomes maximum in a central part of a thickness of said polysilane material, and decreases with distance from said central part, and in said ultraviolet irradiation step, said ultraviolet rays are applied from opposite sides of said polysilane material.

The 22nd aspect of the present invention provides a three-dimensional image pickup apparatus including:

a display panel having said distributed refractive index lens of the second invention; and a camera that photographs an image of a subject placed on one end surface of said distributed refractive index lens, the image being formed on another end surface of the distributed refractive index lens.

The 23rd aspect of the present invention provides a three-dimensional image reproduction apparatus including:

a display panel having said distributed refractive index lens of the second invention; and a display device array placed on a side of one end surface of said distributed refractive index lens and having a plurality of display devices facing maximum parts of a plurality of refractive index distributions in said distributed refractive index lens.

The 24th aspect of the present invention provides a three-dimensional image pickup apparatus including:

said distributed refractive index lens of the eighth invention; and a camera instrument which picks up an image formed on each end portion of said areas on said emission surface of said distributed refractive index lens.

The 25th aspect of the present invention provides the three-dimensional image pickup apparatus of the 24th aspect of the present invention, wherein said plurality of areas in said distributed refractive index lens are placed in a matrix, and opposite end portions of said areas are exposed in said opposite sides, and said refractive index distribution and a distance between said opposite end portions of said areas are determined so that light from a subject entering each area from said incident surface forms an erect image of said subject on a surface of each end portion exposed in said emission surface.

The 26th aspect of the present invention provides a three-dimensional image reproduction apparatus including:

said distributed refractive index lens of the first invention; and a display instrument which displays an image formed for three-dimensional display on each position corresponding to each end portion of said areas on said incident surface of said distributed refractive index lens.

The 27th aspect of the present invention provides a production method of a distributed refractive index lens in which a plurality of laminating members having a plurality of areas with predetermined refractive index distribution in a direction substantially perpendicular to a predetermined axis substantially parallel to lamination surfaces of the laminating members are laminated in a thickness direction, and axes for the plurality of areas are substantially parallel, said production method including:

a first step of supplying a base material containing polysilane as a main ingredient;

a second step of causing an oxidation reaction of said polysilane in said supplied base material, and controlling a development of said oxidation reaction according to a position in said base material to form areas having the predetermined refractive index distribution in which the refractive index substantially decreases with distance from each respective axis, the areas being spaced apart by predetermined intervals, and a third step of supplying a plurality of base materials formed in said second step and laminating said base materials in a thickness direction of said base material.

The 28th aspect of the present invention provides the production method of the 27th aspect of the present invention, wherein: said second step includes applying ultraviolet rays from opposite sides of said base material, and wherein: the controlling the development of said oxidation reaction according to the position in said base material is controlling the development of said oxidation reaction according to (1) a distance from a surface of said base material for said position with reference to the thickness direction of said base material, and (2) irradiation intensity of said ultraviolet rays for the position with reference to a width direction of said base material.

The 29th aspect of the present invention provides a three-dimensional image pickup apparatus including: said distributed refractive index lens of the 11th aspect of the present invention; and a camera instrument which picks up an image formed on an end surface of each said laminating member on said emission surface of said distributed refractive index lens.

The 30th aspect of the present invention provides the three-dimensional image pickup apparatus of the 29th aspect of the present invention, wherein in said distributed refractive index lens, said refractive index distribution and a distance between said opposite end portions are determined so that an erect image of a subject is formed on the end surface of each said laminating member exposed in said emission surface when light from a subject enters said incident surface.

The 31st aspect of the present invention provides a three-dimensional image reproduction apparatus including: said distributed refractive index lens of the 11th aspect of the present invention, and a display instrument which displays an image for three-dimensional display on each end surface of each said laminating member on said incident surface of said distributed refractive index lens.

The 32nd aspect of the present invention provides the three-dimensional image reproduction apparatus of the 31st aspect of the present invention including:

a sensor which detects a position of a user using said three-dimensional image reproduction apparatus; and a drive instrument which rotates said distributed refractive index lens on the basis of a detection result of said sensor.

The 33rd aspect of the present invention provides a production method for producing a distributed refractive index lens in which a plurality of first and further laminating base materials having predetermined refractive index distributions are laminated in a thickness direction of said first base material, said production method including:

a first step of supplying the first base material containing polysilane as a main ingredient;

a second step of causing an oxidation reaction of said polysilane in the supplied first base material, and controlling a development of said oxidation reaction with reference to the thickness direction of said first base material to form the refractive index distribution in which said refractive index substantially decreases from a center toward opposite sides of said first base material with reference to the thickness of said first base material; and a third step of supplying a plurality of the further base materials and repeating said second step with the further base materials and laminating the further base materials and the first base material together in the thickness direction of said first base material.

The 34th aspect of the present invention provides the production method of the 33rd aspect of the present invention, wherein said second step includes applying ultraviolet rays from opposite sides of said base material, and wherein the controlling the development of said oxidation reaction with reference to the thickness direction of said base material is controlling the development of said oxidation reaction according to a distance from a surface of a respective one of the base materials for a position in said respective one of the base materials with reference to the thickness direction of said respective one of the base materials.

INDUSTRIAL APPLICABILITY

The distributed refractive index lens and the production method of the distributed refractive index lens according to the present invention are high in productivity, and are useful as, for example, the three-dimensional image pickup apparatus and the three-dimensional image reproduction apparatus.

The invention claimed is:

1. A production method of a distributed refractive index lens comprising a plurality of areas having refractive index distribution, said production method including:

a first step of supplying a base material containing polysilane as a main ingredient; and a second step of applying ultraviolet rays having an intensity distribution to said base material to form said refractive index distribution on said base material;

wherein a center axis of a change of a refractive index in said each area is orthogonal with respect to a direction of an ultraviolet-exposure to said polysilane.

2. The production method of a distributed refractive index lens according to claim 1, wherein said refractive index distribution on each of said plurality of areas has a maximum refractive index distributed at a location of said center axis, as a maximum portion, and includes a change in said refractive index decreasing with distance from said location of said center axis in said area including said maximum refractive index.

3. The production method of a distributed refractive index lens according to claim 2, wherein said base material in which said areas have been formed is a member in which siloxane structures are distributed in said base material containing polysilane as a main ingredient such that said refractive index distribution correlates with the distribution of the siloxane structures in the base material.

4. A three-dimensional image reproduction apparatus including:
a display panel having the distributed refractive index lens produced by the production method of a distributed refractive index lens according to claim 2; and
a display device array placed on a side of one end surface of said distributed refractive index lens and having a plurality of display devices facing maximum parts of a plurality of refractive index distributions in said distributed refractive index lens.

5. A three-dimensional image pickup apparatus including:
a display panel having the distributed refractive index lens produced by the production method of a distributed refractive index lens according to claim 2; and
a camera that photographs an image of a subject placed on one end surface of said distributed refractive index lens, the image being formed on another end surface of the distributed refractive index lens.

6. The production method of a distributed refractive index lens according to claim 2, wherein said refractive index distribution in a plane which is orthogonal with respect to said center axis includes a concentric circular distribution around said maximum refractive index in said area.

7. The production method of a distributed refractive index lens according to claim 6, wherein a plurality of said center axes corresponding to said plurality of maximum portions are placed periodically and substantially parallel.

8. The production method of a distributed refractive index lens according to claim 7, wherein said center axis is an axis of rotational symmetry of said refractive index distribution in said area.

9. The production method of a distributed refractive index lens according to claim 2, further comprising:
a third step of supplying a plurality of the base materials which are formed in said second step and laminating each said base material together in a thickness direction of said base material,
wherein
said refractive index distribution of each respective area is a distribution around said center axis, in which said refractive index substantially decreases with distance from said center axis in a direction substantially perpendicular to said center axis,
each of said center axes for said plurality of areas is substantially parallel to a lamination surface of each of said laminated base materials, and said center axes are substantially parallel to each other, and
one of opposite side surfaces of said laminated base materials perpendicular to said center axes is an incident surface of light, and another one of the opposite side surfaces is an emission surface of said light.

10. The production method of a distributed refractive index lens according to claim 9, wherein said refractive index distribution on each of said areas is a distribution in which said refractive index substantially decreases with distance from said respective center axis in all directions in any plane substantially perpendicular to said respective center axis.

11. The production method of a distributed refractive index lens according to claim 10, wherein
in said third step, said base materials are laminated so that opposite end portions of said plural areas are exposed in said opposite sides and said exposed opposite end portions are placed in the matrix state, and
said refractive index distribution and a distance between said opposite end portions of said areas are determined so that light from a subject entering each area from said incident surface form an image of said subject on a surface of each end portion exposed in said emission surface.

12. A three-dimensional image pickup apparatus including:
the distributed refractive index lens produced by the production method of a distributed refractive index lens according to claim 9; and
a camera instrument which picks up an image formed on each end portion of said areas on said emission surface of said distributed refractive index lens.

13. The three-dimensional image pickup apparatus according to claim 12, wherein said plurality of areas in said distributed refractive index lens are placed in a matrix, and opposite end portions of said areas are exposed in said opposite sides, and
said refractive index distribution and a distance between said opposite end portions of said areas are determined so that light from a subject entering each area from said incident surface forms an erect image of said subject on a surface of each end portion exposed in said emission surface.

14. A three-dimensional image reproduction apparatus including:
the distributed refractive index lens produced by the production method of a distributed refractive index lens according to claim 9; and
a display instrument which displays an image formed for three-dimensional display on each position corresponding to each end portion of said areas on said incident surface of said distributed refractive index lens.

15. A production method for producing a distributed refractive index lens including a plurality of areas having a refractive index distribution, comprising:
a polysilane material preparing step of preparing a substrate of polysilane material to which an oxide is added in a predetermined distribution; and
an ultraviolet irradiation step of applying ultraviolet rays having an intensity distribution to said substrate of said polysilane material to form said refractive index distribution on said polysilane material,
wherein said predetermined distribution of said oxide is a distribution in which a concentration of said oxide is lower at a part closer to an irradiation surface of said polysilane material to which said ultraviolet rays are applied.

16. The production method according to claim 15, wherein said polysilane material preparing step includes a polysilane material applying step of applying said polysilane material on a transparent substrate, and
in said ultraviolet irradiation step, the ultraviolet rays are applied from opposite sides: an upper surface of said polysilane material and a lower surface thereof through said transparent substrate.

17. The production method according to claim 15, wherein said polysilane material preparing step includes a polysilane material filling step of filling said polysilane material between a plurality of transparent substrates placed in parallel with a predetermined distance therebetween, and in said ultraviolet irradiation step, the ultraviolet rays are applied from opposite sides of said polysilane material so as to be applied to said polysilane material through said plurality of transparent substrates.

18. The production method according to claim 15, wherein said ultraviolet irradiation step includes applying the ultraviolet rays to said polysilane material through a diffraction grating so that ultraviolet ray having said intensity distribution are applied to said polysilane material.

19. A three-dimensional image pickup apparatus including:
    a display panel having the distributed refractive index lens produced by the production method of a distributed refractive index lens according to claim 15; and
    a camera that photographs an image of a subject placed on one end surface of said distributed refractive index lens, the image being formed on another end surface of the distributed refractive index lens.

20. A three-dimensional image reproduction apparatus including:
    a display panel having the distributed refractive index lens produced by the production method of a distributed refractive index lens according to claim 15; and
    a display device array placed on a side of one end surface of said distributed refractive index lens and having a plurality of display devices facing maximum parts of a plurality of refractive index distributions in said distributed refractive index lens.

21. The production method according to claim 15, wherein said ultraviolet irradiation step includes:
    placing a mask plate having an ultraviolet rays transmittance distribution in parallel with said polysilane material on one surface of said polysilane material, and
    applying the ultraviolet rays having a substantially uniform intensity through said mask plate so that said ultraviolet rays having an intensity distribution are applied to said polysilane material.

22. The production method according to claim 21, wherein said ultraviolet irradiation step further includes:
    placing another mask plate having a common ultraviolet rays transmittance distribution as said mask plate in parallel on an opposite side of said polysilane material, and
    applying the ultraviolet rays having the substantially uniform intensity from two directions outside said mask plate and said another mask plate so that the ultraviolet rays having said intensity distribution are applied to opposite sides of said polysilane material through said mask plate and said another mask plate.

23. The production method according to claim 15, wherein said intensity distribution of said ultraviolet rays is a distribution in which an intensity of said ultraviolet rays applied to a part with a first refractive index is higher than an intensity of said ultraviolet rays applied to another part with a second refractive index to achieve said refractive index distribution, the first refractive index being lower than the second refractive index.

24. The production method according to claim 23, wherein said distribution of said oxide is a distribution in which a concentration of said oxide becomes maximum in a central part of a thickness of said polysilane material, and decreases with distance from said central part, and
    in said ultraviolet irradiation step, said ultraviolet rays are applied from opposite sides of said polysilane material.

25. A production method for producing a distributed refractive index lens in which a plurality of laminating base materials including respective areas having predetermined refractive index distributions are laminated in a thickness direction of said base material, said production method including:
    a first step of supplying a base material containing polysilane as a main ingredient,
    a second step of applying ultraviolet rays having an intensity distribution to said base material to form said refractive index distribution on said base material, and
    a third step of supplying a plurality of the base materials which are formed in said second step and laminating each said base material together in a thickness direction of said base material,
    wherein a direction of a change of a refractive index in said each area is according to a direction of an ultraviolet exposure to said polysilane.

26. The production method of a distributed refractive index lens according to claim 25, wherein said base material in which said areas have been formed is a member in which siloxane structures are distributed in said base material containing polysilane as a main ingredient such that said refractive index distribution correlates with the distribution of the siloxane structures in the base material.

27. A three-dimensional image pickup apparatus including:
    a display panel having the distributed refractive index lens produced by the production method of a distributed refractive index lens according to claim 25; and
    a camera that photographs an image of a subject placed on one end surface of said distributed refractive index lens, the image being formed on another end surface of the distributed refractive index lens.

28. A three-dimensional image reproduction apparatus including:
    a display panel having the distributed refractive index lens produced by the production method of a distributed refractive index lens according to claim 25; and
    a display device array placed on a side of one end surface of said distributed refractive index lens and having a plurality of display devices facing maximum parts of a plurality of refractive index distributions in said distributed refractive index lens.

29. The production method of a distributed refractive index lens according to claim 25, wherein
    said refractive index distribution of said areas is a distribution in which said refractive index substantially decreases from a center toward a lamination surface of said laminated base material in said thickness direction of said base material in which said areas have been formed,
    one of opposite side surfaces of said laminated base materials substantially parallel to said laminating direction is an incident surface of light, and another one of the opposite side surfaces is an emission surface of said light.

30. The production method of a distributed refractive index lens according to claim 29, wherein said refractive index distribution and a distance between said opposite end portions are determined so that light from a subject entering said incident surface form an image of said subject on an end surface of each of said laminated base material exposed in said emission surface.

31. A three-dimensional image reproduction apparatus including: the distributed refractive index lens produced by the production method of a distributed refractive index lens according to claim 29, and a display instrument which displays an image for three-dimensional display on each end surface of each said laminating member on said incident surface of said distributed refractive index lens.

32. The three-dimensional image reproduction apparatus according to claim 31 including:
a sensor which detects a position of a user using said three-dimensional image reproduction apparatus; and
a drive instrument which rotates said distributed refractive index lens on the basis of a detection result of said sensor.

33. A three-dimensional image pickup apparatus including: the distributed refractive index lens produced by the production method of a distributed refractive index lens according to claim 29; and
a camera instrument which picks up an image formed on an end surface of each said laminating member on said emission surface of said distributed refractive index lens.

34. The three-dimensional image pickup apparatus according to claim 33, wherein in said distributed refractive index lens, said refractive index distribution and a distance between said opposite end portions are determined so that an erect image of a subject is formed on the end surface of each said laminating member exposed in said emission surface when light from a subject enters said incident surface.

35. The production method of a distributed refractive index lens according to claim 25, wherein said refractive index distribution of each of said areas has a maximum refractive index which is zonally distributed, as a maximum portion, and includes a change in said refractive index decreasing with distance from said location of said maximum portion in said area including said maximum refractive index.

36. The production method of a distributed refractive index lens according to claim 35, wherein said plurality of maximum parts are placed in parallel at regular intervals.

* * * * *